(12) United States Patent
Yun et al.

(10) Patent No.: US 7,898,656 B2
(45) Date of Patent: Mar. 1, 2011

(54) APPARATUS AND METHOD FOR CROSS AXIS PARALLEL SPECTROSCOPY

(75) Inventors: Seok-Hyun Yun, Cambridge, MA (US); Giuliano Scarcelli, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 302 days.

(21) Appl. No.: 12/112,205

(22) Filed: Apr. 30, 2008

(65) Prior Publication Data
US 2009/0273777 A1    Nov. 5, 2009

(51) Int. Cl.
G01J 3/00    (2006.01)
G01J 3/45    (2006.01)
G01B 9/02    (2006.01)

(52) U.S. Cl. .......................................... 356/300; 356/454
(58) Field of Classification Search .................. 356/300, 356/328, 454
See application file for complete search history.

(56) References Cited

U.S. PATENT DOCUMENTS

| | | | |
|---|---|---|---|
| 3,090,753 A | 5/1963 | Matuszak et al. |
| 3,872,407 A | 3/1975 | Hughes |
| 4,030,831 A | 6/1977 | Gowrinathan |
| 4,140,364 A | 2/1979 | Yamashita et al. |
| 4,224,929 A | 9/1980 | Furihata |
| 4,585,349 A | 4/1986 | Gross et al. |
| 4,639,999 A | 2/1987 | Daniele |
| 4,650,327 A | 3/1987 | Ogi |
| 4,734,578 A | 3/1988 | Horikawa |
| 4,744,656 A | 5/1988 | Moran et al. |
| 4,751,706 A | 6/1988 | Rohde et al. |
| 4,763,977 A | 8/1988 | Kawasaki et al. |
| 4,827,907 A | 5/1989 | Tashiro et al. |
| 4,834,111 A | 5/1989 | Khanna et al. |
| 4,890,901 A | 1/1990 | Cross, Jr. |
| 4,905,169 A | 2/1990 | Buican et al. |

(Continued)

FOREIGN PATENT DOCUMENTS

CN    1550203    12/2004

(Continued)

OTHER PUBLICATIONS

Liptak David C. et al., (2007) "On the Development of a Confocal Rayleigh-Brillouin Microscope" *American Institute of Physics* vol. 78, 016106.

(Continued)

Primary Examiner — Patrick J Connolly
(74) Attorney, Agent, or Firm — Dorsey & Whitney LLP

(57) ABSTRACT

An exemplary embodiment of apparatus and method to measure and filter the spectrum of electro-magnetic radiation using multiple dispersive elements, such as diffraction gratings or VIPA etalons, concatenated in a cross-axis orthogonal arrangement can be provided. For example, it is possible to receive at least one first electro-magnetic radiation and generate at least one second electro-magnetic radiation using at least one first spectral separating arrangement. A first spectrum of the second electro-magnetic radiation can be dispersed along at least one first dispersive axis with respect to a propagation direction of the second electro-magnetic radiation. In addition, it is possible to, using at least one second arrangement, receive the second electro-magnetic radiation and produce at least one third electromagnetic radiation having a second spectrum dispersed along at least one second dispersive axis with respect to a propagation direction of the third electromagnetic radiation. The orientations of the respective first and second dispersive axes can be different from one another. The first and/or second dispersive arrangements can be VIPA etalon arrangements.

22 Claims, 11 Drawing Sheets

U.S. PATENT DOCUMENTS

| | | |
|---|---|---|
| 4,909,631 A | 3/1990 | Tan et al. |
| 4,940,328 A | 7/1990 | Hartman |
| 4,966,589 A | 10/1990 | Kaufman |
| 4,984,888 A * | 1/1991 | Tobias ............................ 356/328 |
| 4,998,972 A | 3/1991 | Chin et al. |
| 5,085,496 A | 2/1992 | Yoshida et al. |
| 5,121,983 A | 6/1992 | Lee |
| 5,202,931 A | 4/1993 | Bacus et al. |
| 5,208,651 A | 5/1993 | Buican |
| 5,212,667 A | 5/1993 | Tomlinson et al. |
| 5,214,538 A | 5/1993 | Lobb |
| 5,217,456 A | 6/1993 | Narciso, Jr. |
| 5,241,364 A | 8/1993 | Kimura et al. |
| 5,250,186 A | 10/1993 | Dollinger et al. |
| 5,251,009 A | 10/1993 | Bruno |
| 5,275,594 A | 1/1994 | Baker |
| 5,281,811 A | 1/1994 | Lewis |
| 5,283,795 A | 2/1994 | Fink |
| 5,302,025 A | 4/1994 | Kleinerman |
| 5,304,173 A | 4/1994 | Kittrell et al. |
| 5,317,389 A | 5/1994 | Hochberg et al. |
| 5,318,024 A | 6/1994 | Kittrell et al. |
| 5,348,003 A | 9/1994 | Caro |
| 5,394,235 A | 2/1995 | Takeuchi et al. |
| 5,404,415 A | 4/1995 | Mori et al. |
| 5,424,827 A * | 6/1995 | Horwitz et al. ............... 356/328 |
| 5,522,004 A | 5/1996 | Djupsjobacka et al. |
| 5,555,087 A | 9/1996 | Miyagawa et al. |
| 5,565,983 A * | 10/1996 | Barnard ......................... 356/328 |
| 5,565,986 A | 10/1996 | Knuttel |
| 5,566,267 A | 10/1996 | Neuberger |
| 5,635,830 A | 6/1997 | Itoh |
| 5,649,924 A | 7/1997 | Everett et al. |
| 5,730,731 A | 3/1998 | Mollenauer et al. |
| 5,748,318 A | 5/1998 | Maris et al. |
| 5,752,518 A | 5/1998 | McGee et al. |
| 5,785,651 A | 7/1998 | Baker et al. |
| 5,801,831 A * | 9/1998 | Sargoytchev ................. 356/454 |
| 5,810,719 A | 9/1998 | Toida |
| 5,817,144 A | 10/1998 | Gregory |
| 5,836,877 A | 11/1998 | Zavislan et al. |
| 5,910,839 A | 6/1999 | Erskine et al. |
| 5,912,764 A | 6/1999 | Togino |
| 5,926,592 A | 7/1999 | Harris et al. |
| 5,955,737 A | 9/1999 | Hallidy et al. |
| 5,975,697 A | 11/1999 | Podoleanu et al. |
| 5,994,690 A | 11/1999 | Kulkarni et al. |
| 5,995,223 A | 11/1999 | Power |
| 6,007,996 A | 12/1999 | McNamara et al. |
| 6,010,449 A | 1/2000 | Selmon et al. |
| 6,016,197 A | 1/2000 | Krivoshlykov |
| 6,020,963 A | 2/2000 | DiMarzio et al. |
| 6,025,956 A | 2/2000 | Nagano et al. |
| 6,037,579 A | 3/2000 | Chan et al. |
| 6,045,511 A | 4/2000 | Ott et al. |
| 6,078,047 A | 6/2000 | Mittleman et al. |
| 6,094,274 A | 7/2000 | Yokoi |
| 6,107,048 A | 8/2000 | Goldenring et al. |
| 6,245,026 B1 | 6/2001 | Campbell et al. |
| 6,249,381 B1 | 6/2001 | Suganuma |
| 6,249,630 B1 | 6/2001 | Stock et al. |
| 6,297,018 B1 | 10/2001 | French et al. |
| 6,301,048 B1 * | 10/2001 | Cao ................ 359/566 |
| 6,341,036 B1 | 1/2002 | Tearney et al. |
| 6,374,128 B1 | 4/2002 | Toida et al. |
| 6,377,349 B1 | 4/2002 | Fercher |
| 6,396,941 B1 | 5/2002 | Bacus et al. |
| 6,437,867 B2 | 8/2002 | Zeylikovich et al. |
| 6,441,892 B2 * | 8/2002 | Xiao .............................. 356/73 |
| 6,441,959 B1 * | 8/2002 | Yang et al. .................... 359/495 |
| 6,445,485 B1 | 9/2002 | Frigo et al. |
| 6,445,939 B1 | 9/2002 | Swanson et al. |
| 6,475,159 B1 | 11/2002 | Casscells et al. |
| 6,475,210 B1 | 11/2002 | Phelps et al. |
| 6,477,403 B1 | 11/2002 | Eguchi et al. |
| 6,485,413 B1 | 11/2002 | Boppart et al. |
| 6,501,551 B1 | 12/2002 | Tearney et al. |
| 6,516,014 B1 | 2/2003 | Sellin et al. |
| 6,517,532 B1 | 2/2003 | Altshuler et al. |
| 6,538,817 B1 | 3/2003 | Farmer et al. |
| 6,540,391 B2 | 4/2003 | Lanzetta et al. |
| 6,567,585 B2 | 5/2003 | Harris |
| 6,593,101 B2 | 7/2003 | Richards-Kortum et al. |
| 6,611,833 B1 | 8/2003 | Johnson et al. |
| 6,654,127 B2 | 11/2003 | Everett et al. |
| 6,657,730 B2 | 12/2003 | Pfau et al. |
| 6,658,278 B2 | 12/2003 | Gruhl |
| 6,692,430 B2 | 2/2004 | Adler |
| 6,701,181 B2 | 3/2004 | Tang et al. |
| 6,721,094 B1 | 4/2004 | Sinclair et al. |
| 6,738,144 B1 | 5/2004 | Dogariu et al. |
| 6,757,467 B1 | 6/2004 | Rogers |
| 6,831,781 B2 | 12/2004 | Tearney et al. |
| 6,839,496 B1 | 1/2005 | Mills et al. |
| 6,882,432 B2 | 4/2005 | Deck |
| 6,900,899 B2 | 5/2005 | Nevis |
| 6,909,105 B1 | 6/2005 | Heintzmann et al. |
| 6,949,072 B2 | 9/2005 | Furnish et al. |
| 6,961,123 B1 | 11/2005 | Wang et al. |
| 6,996,549 B2 | 2/2006 | Zhang et al. |
| 7,006,232 B2 | 2/2006 | Rollins et al. |
| 7,019,838 B2 | 3/2006 | Izatt et al. |
| 7,027,633 B2 | 4/2006 | Foran et al. |
| 7,061,622 B2 | 6/2006 | Rollins et al. |
| 7,072,047 B2 | 7/2006 | Westphal et al. |
| 7,075,658 B2 | 7/2006 | Izatt et al. |
| 7,113,288 B2 | 9/2006 | Fercher |
| 7,113,625 B2 | 9/2006 | Watson et al. |
| 7,130,320 B2 | 10/2006 | Tobiason et al. |
| 7,139,598 B2 | 11/2006 | Hull et al. |
| 7,142,835 B2 | 11/2006 | Paulus |
| 7,148,970 B2 | 12/2006 | De Boer |
| 7,177,027 B2 | 2/2007 | Hirasawa et al. |
| 7,190,464 B2 | 3/2007 | Alphonse |
| 7,230,708 B2 | 6/2007 | Lapotko et al. |
| 7,236,637 B2 | 6/2007 | Sirohey et al. |
| 7,242,480 B2 | 7/2007 | Alphonse |
| 7,267,494 B2 | 9/2007 | Deng et al. |
| 7,272,252 B2 | 9/2007 | De La Torre-Bueno et al. |
| 7,304,798 B2 | 12/2007 | Izumi et al. |
| 7,330,270 B2 | 2/2008 | O'Hara et al. |
| 7,336,366 B2 | 2/2008 | Choma et al. |
| 7,342,659 B2 * | 3/2008 | Horn et al. .................... 356/328 |
| 7,355,716 B2 | 4/2008 | De Boer et al. |
| 7,355,721 B2 | 4/2008 | Quadling et al. |
| 7,359,062 B2 | 4/2008 | Chen et al. |
| 7,366,376 B2 | 4/2008 | Shishkov et al. |
| 7,382,809 B2 | 6/2008 | Chong et al. |
| 7,391,520 B2 | 6/2008 | Zhou et al. |
| 7,458,683 B2 | 12/2008 | Chernyak et al. |
| 7,530,948 B2 | 5/2009 | Seibel et al. |
| 7,539,530 B2 | 5/2009 | Caplan et al. |
| 7,609,391 B2 | 10/2009 | Betzig |
| 7,630,083 B2 | 12/2009 | de Boer et al. |
| 7,643,152 B2 | 1/2010 | de Boer et al. |
| 7,643,153 B2 | 1/2010 | de Boer et al. |
| 7,646,905 B2 | 1/2010 | Guittet et al. |
| 7,649,160 B2 | 1/2010 | Colomb et al. |
| 7,664,300 B2 | 2/2010 | Lange et al. |
| 7,733,497 B2 | 6/2010 | Yun et al. |
| 7,782,464 B2 | 8/2010 | Mujat et al. |
| 7,805,034 B2 | 9/2010 | Kato et al. |
| 2001/0036002 A1 | 11/2001 | Tearney et al. |
| 2002/0024015 A1 | 2/2002 | Hoffmann et al. |
| 2002/0048025 A1 | 4/2002 | Takaoka |
| 2002/0048026 A1 | 4/2002 | Isshiki et al. |
| 2002/0052547 A1 | 5/2002 | Toida |
| 2002/0057431 A1 | 5/2002 | Fateley et al. |
| 2002/0086347 A1 | 7/2002 | Johnson et al. |
| 2002/0091322 A1 | 7/2002 | Chaiken et al. |
| 2002/0109851 A1 | 8/2002 | Deck |
| 2002/0122182 A1 | 9/2002 | Everett et al. |
| 2002/0140942 A1 | 10/2002 | Fee et al. |
| 2002/0158211 A1 | 10/2002 | Gillispie |
| 2002/0168158 A1 | 11/2002 | Furusawa et al. |
| 2002/0183623 A1 | 12/2002 | Tang et al. |
| 2003/0001071 A1 | 1/2003 | Mandella et al. |

| | | |
|---|---|---|
| 2003/0013973 A1 | 1/2003 | Georgakoudi et al. |
| 2003/0028114 A1 | 2/2003 | Casscells, III et al. |
| 2003/0030816 A1 | 2/2003 | Eom et al. |
| 2003/0053673 A1 | 3/2003 | Dewaele et al. |
| 2003/0067607 A1 | 4/2003 | Wolleschensky et al. |
| 2003/0082105 A1 | 5/2003 | Fischman et al. |
| 2003/0097048 A1 | 5/2003 | Ryan et al. |
| 2003/0108911 A1 | 6/2003 | Klimant et al. |
| 2003/0120137 A1 | 6/2003 | Pawluczyk et al. |
| 2003/0137669 A1 | 7/2003 | Rollins et al. |
| 2003/0165263 A1 | 9/2003 | Hamer et al. |
| 2003/0174339 A1 | 9/2003 | Feldchtein et al. |
| 2003/0220749 A1 | 11/2003 | Chen et al. |
| 2004/0002650 A1 | 1/2004 | Mandrusov et al. |
| 2004/0039298 A1 | 2/2004 | Abreu |
| 2004/0054268 A1 | 3/2004 | Esenaliev et al. |
| 2004/0072200 A1 | 4/2004 | Rigler et al. |
| 2004/0075841 A1 | 4/2004 | Van Neste et al. |
| 2004/0076940 A1 | 4/2004 | Alexander et al. |
| 2004/0077949 A1 | 4/2004 | Blofgett et al. |
| 2004/0085540 A1 | 5/2004 | Lapotko et al. |
| 2004/0110206 A1 | 6/2004 | Wong et al. |
| 2004/0126048 A1 | 7/2004 | Dave et al. |
| 2004/0126120 A1 | 7/2004 | Cohen et al. |
| 2004/0150830 A1 | 8/2004 | Chan |
| 2004/0152989 A1 | 8/2004 | Puttappa et al. |
| 2004/0165184 A1 | 8/2004 | Mizuno |
| 2004/0189999 A1 | 9/2004 | De Groot et al. |
| 2004/0239938 A1 | 12/2004 | Izatt |
| 2004/0246490 A1 | 12/2004 | Wang |
| 2004/0246583 A1 | 12/2004 | Mueller et al. |
| 2004/0254474 A1 | 12/2004 | Seibel et al. |
| 2004/0263843 A1 | 12/2004 | Knopp et al. |
| 2005/0018133 A1 | 1/2005 | Huang et al. |
| 2005/0018201 A1 | 1/2005 | De Boer et al. |
| 2005/0035295 A1 | 2/2005 | Bouma et al. |
| 2005/0036150 A1 | 2/2005 | Izatt et al. |
| 2005/0046837 A1 | 3/2005 | Izumi et al. |
| 2005/0057680 A1 | 3/2005 | Agan |
| 2005/0057756 A1 | 3/2005 | Fang-Yen et al. |
| 2005/0059894 A1 | 3/2005 | Zeng et al. |
| 2005/0065421 A1 | 3/2005 | Burckhardt et al. |
| 2005/0128488 A1 | 6/2005 | Yelin et al. |
| 2005/0165303 A1 | 7/2005 | Kleen et al. |
| 2005/0171438 A1 | 8/2005 | Chen et al. |
| 2005/0190372 A1 | 9/2005 | Dogariu et al. |
| 2005/0254061 A1 | 11/2005 | Alphonse et al. |
| 2006/0033923 A1 | 2/2006 | Hirasawa et al. |
| 2006/0093276 A1 | 5/2006 | Bouma et al. |
| 2006/0103850 A1 | 5/2006 | Alphonse et al. |
| 2006/0146339 A1 | 7/2006 | Fujita et al. |
| 2006/0164639 A1* | 7/2006 | Horn et al. ............ 356/326 |
| 2006/0171503 A1 | 8/2006 | O'Hara et al. |
| 2006/0244973 A1 | 11/2006 | Yun et al. |
| 2007/0019208 A1 | 1/2007 | Toida et al. |
| 2007/0038040 A1 | 2/2007 | Cense et al. |
| 2007/0070496 A1 | 3/2007 | Gweon et al. |
| 2007/0076217 A1 | 4/2007 | Baker et al. |
| 2007/0086013 A1 | 4/2007 | De Lega et al. |
| 2007/0086017 A1 | 4/2007 | Buckland et al. |
| 2007/0091317 A1 | 4/2007 | Freischlad et al. |
| 2007/0133002 A1 | 6/2007 | Wax et al. |
| 2007/0188855 A1 | 8/2007 | Shishkov et al. |
| 2007/0223006 A1 | 9/2007 | Tearney et al. |
| 2007/0236700 A1 | 10/2007 | Yun et al. |
| 2007/0258094 A1 | 11/2007 | Izatt et al. |
| 2007/0291277 A1 | 12/2007 | Everett et al. |
| 2008/0002197 A1 | 1/2008 | Sun et al. |
| 2008/0007734 A1 | 1/2008 | Park et al. |
| 2008/0049220 A1 | 2/2008 | Izzia et al. |
| 2008/0094613 A1 | 4/2008 | de Boer et al. |
| 2008/0094637 A1 | 4/2008 | de Boer et al. |
| 2008/0097225 A1 | 4/2008 | Tearney et al. |
| 2008/0097709 A1 | 4/2008 | de Boer et al. |
| 2008/0100837 A1 | 5/2008 | de Boer et al. |
| 2008/0152353 A1 | 6/2008 | de Boer et al. |
| 2008/0154090 A1 | 6/2008 | Hashimshony |
| 2008/0204762 A1 | 8/2008 | Izatt et al. |
| 2008/0265130 A1 | 10/2008 | Colomb et al. |
| 2008/0308730 A1 | 12/2008 | Vizi et al. |
| 2009/0011948 A1 | 1/2009 | Unlu et al. |
| 2009/0196477 A1 | 8/2009 | Cense et al. |
| 2009/0273777 A1* | 11/2009 | Yun et al. ............ 356/300 |
| 2009/0290156 A1 | 11/2009 | Popescu et al. |
| 2010/0086251 A1 | 4/2010 | Xu et al. |
| 2010/0094576 A1 | 4/2010 | de Boer et al. |
| 2010/0150467 A1 | 6/2010 | Zhao et al. |

FOREIGN PATENT DOCUMENTS

| | | |
|---|---|---|
| EP | 0617286 | 2/1994 |
| EP | 0728440 | 8/1996 |
| EP | 1324051 | 7/2003 |
| FR | 2738343 | 8/1995 |
| GB | 2298054 | 8/1996 |
| JP | 6073405 | 4/1985 |
| JP | 20040056907 | 2/1992 |
| JP | 5509417 | 11/1993 |
| JP | 2002214127 | 7/2002 |
| JP | 20030035659 | 2/2003 |
| JP | 2007271761 | 10/2007 |
| WO | 7900841 | 10/1979 |
| WO | 9201966 | 2/1992 |
| WO | 9216865 | 10/1992 |
| WO | 9800057 | 1/1998 |
| WO | 9848846 | 11/1998 |
| WO | 9944089 | 2/1999 |
| WO | 0101111 | 1/2001 |
| WO | 0127679 | 4/2001 |
| WO | 0237075 | 5/2002 |
| WO | 02053050 | 7/2002 |
| WO | 02084263 | 10/2002 |
| WO | 03046495 | 6/2003 |
| WO | 03046636 | 6/2003 |
| WO | 03062802 | 7/2003 |
| WO | 03105678 | 12/2003 |
| WO | 2004057266 | 7/2004 |
| WO | 2005047813 | 5/2005 |
| WO | 2005082225 | 9/2005 |
| WO | 20050822225 | 9/2005 |
| WO | 2006004743 | 1/2006 |
| WO | 2006038876 | 4/2006 |
| WO | 2006039091 | 4/2006 |
| WO | 2006059109 | 6/2006 |
| WO | 2006124860 | 11/2006 |
| WO | 20070028531 | 3/2007 |
| WO | 2007083138 | 7/2007 |

OTHER PUBLICATIONS

Office Action mailed Oct. 1, 2008 for U.S. Appl. No. 11/955,986.
Invitation of Pay Additional Fees mailed Aug. 7, 2008 for International Application No. PCT/US2008/062354.
Invitation of Pay Additional Fees mailed Jul. 20, 2008 for International Application No. PCT/US2007/081982.
International Search Report and Written Opinion mailed Mar. 7, 2006 for PCT/US2005/035711.
International Search Report and Written Opinion mailed Jul. 18, 2008 for PCT/US2008/057533.
Aizu, Y et al. (1991) "Bio-Speckle Phenomena and Their Application to the Evaluation of Blood Flow" Optics and Laser Technology, vol. 23, No. 4, Aug. 1, 1991.
Richards G.J. et al. (1997) "Laser Speckle Contrast Analysis (LASCA): A Technique for Measuring Capillary Blood Flow Using the First Order Statistics of Laser Speckle Patterns" Apr. 2, 1997.
Gonick, Maria M., et al (2002) "Visualization of Blood Microcirculation Parameters in Human Tissues by Time Integrated Dynamic Speckles Analysis" vol. 972, No. 1, Oct. 1, 2002.
International Search Report and Written Opinion mailed Jul. 4, 2008 for PCT/US2008/051432.
Jonathan, Enock (2005) "Dual Reference Arm Low-Coherence Interferometer-Based Reflectometer For Optical Coherence Tomography (OCT) Application" Optics Communications vol. 252.
Motaghian Nezam, S.M.R. (2007) "increased Ranging Depth in optical Frequency Domain Imaging by Frequency Encoding" Optics Letters, vol. 32, No. 19, Oct. 1, 2007.
Office Action dated Jun. 30, 2008 for U.S. Appl. No. 11/670,058.

Office Action dated Jul. 7, 2008 for U.S. Appl. No. 10/551,735.
Australian Examiner's Report mailed May 27, 2008 for Australian patent application No. 2003210669.
Notice of Allowance mailed Jun. 4, 2008 for U.S. Appl. No. 11/174,425.
European communication dated May 15, 2008 for European patent application No. 05819917.5.
International Search Report and Written Opinion mailed Jun. 10, 2008 for PCT/US2008/051335.
Oh. W.Y. et al (2006) "Ultrahigh-Speed Optical Frequency Domain Imaging and Application to laser Ablation Monitoring" *Applied Physics Letters*, vol. 88.
Office Action dated Aug. 21, 2008 for U.S. Appl. No. 11/505,700.
Sticker, Markus (2002) En Face Imaging of Single Cell layers by Differential Phase-Contrast Optical Coherence Microscopy) *Optics Letters*, col. 27, No. 13, Jul. 1, 2002.
International Search Report and Written Opinion dated Jul. 17, 2008 for International Application No. PCT/US2008/057450.
International Search Report and Written Opinion dated Aug. 11, 2008 for International Application No. PCT/US2008/058703.
US National Library of Medicine (NLM), Bethesda, MD, US; Oct. 2007, "Abstracts of the 19$^{th}$ Annual Symposium of Transcatheter Cardiovascular Therapeutics, Oct. 20-25, 2007, Washington, DC, USA."
International Search Report and Written Opinion dated May 26, 2008 for International Application No. PCT/US2008/051404.
Office Action dated Aug. 25, 2008 for U.S. Appl. No. 11/264,655.
Office Action dated Sep. 11, 2008 for U.S. Appl. No. 11/624,334.
Office Action dated Aug. 21, 2008 for U.S. Appl. No. 11/956,079.
Gelikono, V. M. et al. Oct. 1, 2004 "Two-Wavelength Optical Coherence Tomography" Radio physics and Quantum Electronics, Kluwer Academic Publishers-Consultants. vol. 47, No. 10-1.
International Search Report and Written Opinion for PCT/US2007/081982 dated Oct. 19, 2007.
Database Compendex Engineering Information, Inc., New York, NY, US; Mar. 5, 2007, Yelin, Dvir et al: "Spectral-Domain Spectrally-Encoded Endoscopy".
Database Biosis Biosciences Information Service, Philadelphia, PA, US; Oct. 2006, Yelin D. et al: "Three-Dimensional Miniature Endoscopy".
International Search Report and Written Opinion mailed Mar. 14, 2005 for PCT/US2004/018045.
Notification of the international Preliminary Report on Patentability mailed Oct. 21, 2005.
Shim M.G. et al., "Study of Fiber-Optic Probes For In vivo Medical Raman Spectroscopy" Applied Spectroscopy. vol. 53, No. 6, Jun. 1999.
Bingid U. et al., "Fibre-Optic Laser-Assisted Infrared Tumour Diagnostics (FLAIR); Infrared Tomour Diagnostics" Journal of Physics D. Applied Physics, vol. 38, No. 15, Aug. 7, 2005.
Jun Zhang et al. "Full Range Polarization-Sensitive Fourier Domain Optical Coherence Tomography" Optics Express, vol. 12, No. 24. Nov. 29, 2004.
Yonghua et al., "Real-Time Phase-Resolved Functional Optical Hilbert Transformation" Optics Letters, vol. 27, No. 2, Jan. 15, 2002.
Siavash et al., "Self-Referenced Doppler Optical Coherence Tomography" Optics Letters, vol. 27, No. 23, Dec. 1, 2002.
International Search Report and Written Opinion dated Dec. 20, 2004 for PCT/US04/10152.
Notification Concerning Transmittal of International Preliminary Report on Patentability dated Oct. 13, 2005 for PCT/US04/10152.
International Search Report and Written Opinion dated Mar. 23, 2006 for PCT/US2005/042408.
International Preliminary Report on Patentability dated Jun. 7, 2007 for PCT/US2005/042408.
International Search Report and Written Opinion dated Feb. 28, 2007 for International Application No. PCT/US2006/038277.
International Search Report and Written Opinion dated Jan. 30, 2009 for International Application No. PCT/US2008/081834.
International Search Report and Written Opinion dated Feb. 2, 2009 for International Application No. PCT/US2008/071786.

Bilenca A et al: "The Role of Amplitude and phase in Fluorescence Coherence Imaging: From Wide Filed to Nanometer Depth Profiling", *Optics IEEE*, May 5, 2007.
Inoue, Yusuke et al: "Varible Phase-Contrast Fluorescence Spectrometry for Fluorescently Strained Cells", *Applied Physics Letters*, Sep. 18, 2006.
Bernet, S et al: "Quantitative Imaging of Complex Samples by Spiral Phase Contrast Microscopy", *Optics Express*, May 9, 2006.
International Search Report and Written Opinion dated Jan. 15, 2009 for International Application No. PCT/US2008/074863.
Office Action dated Feb. 17, 2009 for U.S. Appl. No. 11/211,483.
Notice of Reasons for Rejection mailed Dec. 2, 2008 for Japanese patent application No. 2000-533782.
International Search Report and Written Opinion dated Feb. 24, 2009 for PCT/US2008/076447.
European Official Action dated Dec. 2, 2008 for EP 07718117.0.
Barfuss et al (1989) "Modified Optical Frequency Domain Reflectometry with High spatial Resolution for Components of integrated optic Systems", Journal of Lightwave Technology, IEEE vol. 7., No. 1.
Yun et al., (2004) "Removing the Depth-Degeneracy in Optical Frequency Domain Imaging with Frequency Shifting", Optics Express, vol. 12, No. 20.
International Search Report and Written Opinion dated Jun. 10, 2009 for PCT/US08/075456.
European Search Report issued May 5, 2009 for European Application No. 01991471.2.
Motz, J.T. et al: "Spectral- and Frequency-Encoded Fluorescence Imaging" Optics Letters, OSA, Optical Society of America, Washington, DC, US, vol. 30, No. 20, Oct. 15, 2005, pp. 2760-2762.
Japanese Notice of Reasons for Rejection dated Jul. 14, 2009 for Japanese Patent application No. 2006-503161.
Office Action dated Aug. 18, 2009 for U.S. Appl. No. 12/277,178.
Office Action dated Aug. 13, 2009 for U.S. Appl. No. 10/136,813.
Office Action dated Aug. 6, 2009 for U.S. Appl. No. 11/624,455.
Office Action dated May 15, 2009 for U.S. Appl. No. 11/537,123.
Office Action dated Apr. 17, 2009 for U.S. Appl. No. 11/537,343.
Office Action dated Apr. 15, 2009 for U.S. Appl. No. 12/205,775.
International Search Report and Written Opinion dated Dec. 23, 2009 for PCT?US2009/041827.
Office Action dated Dec. 9, 2008 for U.S. Appl. No. 09/709,162.
Office Action dated Dec. 23, 2008 for U.S. Appl. No. 11/780,261.
Office Action dated Jan. 9, 2010 for U.S. Appl. No. 11/624,455.
Office Action dated Feb. 18, 2009 for U.S. Appl. No. 11/285,301.
Beddow et al, (May 2002) "Improved Performance Interferomater Designs for Optical Coherence Tomography", IEEE Optical Fiber Sensors Conference, pp. 527-530.
Yagoob et al., (Jun. 2002) "High-Speed Wavelength-Multiplexed Fiber-Optic Sensors for Biomedicine," Sensors Proceedings of the IEEE, pp. 325-330.
Office Action dated Feb. 18, 2009 for U.S. Appl. No. 11/697,012.
Zhang et al, (Sep. 2004), "Fourier Domain Functional Optical Coherence Tomography", Saratov Fall Meeting 2004, pp. 8-14.
Office Action dated Feb. 23, 2009 for U.S. Appl. No. 11/956,129.
Office Action dated Mar. 16, 2009 for U.S. Appl. No. 11/621,694.
Office Action dated Oct. 1, 2009 for U.S. Appl. No. 11/677,278.
Office Action dated Oct. 6, 2009 for U.S. Appl. No. 12/015,642.
Lin, Stollen et al., (1977) "A CW Tunable Near-infrared (1.085-1.175-um) Raman Oscillator," Optics Letters, vol. 1, 96.
Summons to attend Oral Proceedings dated Oct. 9, 2009 for European patent application No. 06813365.1.
Office Action dated Dec. 15, 2009 for U.S. Appl. No. 11/549,397.
Zhang, J., J. S. Nelson, et al. (2005). "Removal of a mirror image and enhancement of the signal-to-noise ratio in Fourier-domain optical coherence tomography using an electro-optic phase modulator." *Optics Letters* 30(2): 147-149.
Zhang, Y., M. Sato, et al. (2001). "Numerical investigations of optimal synthesis of several low coherence sources for resolution improvement." *Optics Communications* 192(3-6): 183-192.
Zhang, Y., M. Sato, et al. (2001). "Resolution improvement in optical coherence tomography by optimal synthesis of light-emitting diodes." *Optics Letters* 26(4): 205-207.

Zhao, Y., Z. Chen, et al. (2002). "Real-time phase-resolved functional optical coherence tomography by use of optical Hilbert transformation." *Optics Letters* 27(2): 98-100.

Zhao, Y. H., Z. P. Chen, et al. (2000). "Doppler standard deviation imaging for clinical monitoring of in vivo human skin blood flow." *Optics Letters* 25(18): 1358-1360.

Zhao, Y. H., Z. P. Chen, et al. (2000). "Phase-resolved optical coherence tomography and optical Doppler tomography for imaging blood flow in human skin with fast scanning speed and high velocity sensitivity." *Optics Letters* 25(2): 114-116.

Zhou, D., P. R. Prucnal, et al. (1998). "A widely tunable narrow linewidth semiconductor fiber ring laser." *IEEE Photonics Technology Letters* 10(6): 781-783.

Zuluaga, A. F. and R. Richards-Kortum (1999). "Spatially resolved spectral interferometry for determination of subsurface structure." *Optics Letters* 24(8): 519-521.

Zvyagin, A. V., J. B. FitzGerald, et al. (2000). "Real-time detection technique for Doppler optical coherence tomography." *Optics Letters* 25(22): 1645-1647.

Marc Nikles et al., "Brillouin gain spectrum characterization in single-mode optical fibers", *Journal of Lightwave Technology* 1997, 15 (10): 1842-1851.

Tsuyoshi Sonehara et al., "Forced Brillouin Spectroscopy Using Frequency-Tunable Continuous-Wave Lasers", *Physical Review Letters* 1995, 75 (23): 4234-4237.

Hajime Tanaka et al., "New Method of Superheterodyne Light Beating Spectroscopy for Brillouin-Scattering Using Frequency-Tunable Lasers", *Physical Review Letters* 1995, 74 (9): 1609-1612.

Webb RH et al. "Confocal Scanning Laser Ophthalmoscope", *Applied Optics* 1987, 26 (8): 1492-1499.

Andreas Zumbusch et al. "Three-dimensional vibrational imaging by coherent anti-Stokes Raman scattering", *Physical Review Letters* 1999, 82 (20): 4142-4145.

Katrin Kneipp et al., "Single molecule detection using surface-enhanced Raman scattering (SERS)", *Physical Review Letters* 1997, 78 (9): 1667-1670.

K.J. Koski et al., "Brillouin imaging" *Applied Physics Letters* 87, 2005.

Boas et al., "Diffusing temporal light correlation for burn diagnosis", *SPIE*, 1999, 2979:468-477.

David J. Briers, "Speckle fluctuations and biomedical optics: implications and applications", *Optical Engineering*, 1993, 32(2):277-283.

Clark et al., "Tracking Speckle Patterns with Optical Correlation", *SPIE*, 1992, 1772:77-87.

Facchini et al., "An endoscopic system for DSPI", *Optik*, 1993, 95(1):27-30.

Hrabovsky, M., "Theory of speckle dispacement and decorrelation: application in mechanics", *SPIE*, 1998, 3479:345-354.

Sean J. Kirkpatrick et al., "Micromechanical behavior of cortical bone as inferred from laser speckle data", *Journal of Biomedical Materials Research*, 1998, 39(3):373-379.

Sean J. Kirkpatrick et al., "Laser speckle microstrain measurements in vascular tissue", *SPIE*, 1999, 3598:121-129.

Loree et al., "Mechanical Properties of Model Atherosclerotic Lesion Lipid Pools", *Arteriosclerosis and Thrombosis*, 1994, 14(2):230-234.

Podbielska, H. "Interferometric Methods and Biomedical Research", *SPIE*, 1999, 2732:134-141.

Richards-Kortum et al., "Spectral diagnosis of atherosclerosis using an optical fiber laser catheter", *American Heart Journal*, 1989, 118(2):381-391.

Ruth, B. "blood flow determination by the laser speckle method", *Int J Microcirc: Clin Exp*, 1990, 9:21-45.

Shapo et al., "Intravascular strain imaging: Experiments on an Inhomogeneous Phantom", *IEEE Ultrasonics Symposium* 1996, 2:1177-1180.

Shapo et al., "Ultrasonic displacement and strain imaging of coronary arteries with a catheter array", *IEEE Ultrasonics Symposium* 1995, 2:1511-1514.

Thompson et al., "Imaging in scattering media by use of laser speckle", *Opt. Soc. Am. A.*, 1997, 14(9):2269-2277.

Thompson et al., "Diffusive media characterization with laser speckle", *Applied Optics*, 1997, 36(16):3726-3734.

Tuchin, Valery V., "Coherent Optical Techniques for the Analysis of Tissue Structure and Dynamics," *Journal of Biomedical Optics*, 1999, 4(1):106-124.

M. Wussling et al., "Laser diffraction and speckling studies in skeletal and heart muscle", *Biomed, Biochim. Acta*, 1986, 45(1/2):S 23-S 27.

T. Yoshimura et al., "Statistical properties of dynamic speckles", *J. Opt. Soc. Am A*. 1986, 3(7):1032-1054.

Zimnyakov et al., "Spatial speckle correlometry in applications to tissue structure monitoring", *Applied Optics* 1997, 36(22): 5594-5607.

Zimnyakov et al., "A study of statistical properties of partially developed speckle fields as applied to the diagnosis of structural changes in human skin", *Optics and Spectroscopy*, 1994, 76(5): 747-753.

Zimnyakov et al., "Speckle patterns polarization analysis as an approach to turbid tissue structure monitoring", *SPIE* 1999, 2981:172-180.

Ramasamy Manoharan et al., "Biochemical analysis and mapping of atherosclerotic human artery using FT-IR microspectroscopy", *Atherosclerosis*, May 1993, 181-1930.

N.V. Salunke et al., "Biomechanics of Atherosclerotic Plaque" *Critical Reviews™ in Biomedical Engineering* 1997, 25(3):243-285.

D. Fu et al., "Non-invasive quantitative reconstruction of tissue elasticity using an iterative forward approach", Phys. Med. Biol. 2000 (45): 1495-1509.

S.B. Adams Jr. et al., "The use of polarization sensitive optical coherence tomography and elastography to assess connective tissue", Optical Soc. of American Washington 2002, p. 3.

International Search Report for International Patent application No. PCT/US2005/039740.

International Written Opinion for International Patent application No. PCT/US2005/039740.

International Search Report for International Patent application No. PCT/US2005/030294.

International Written Opinion for International Patent application No. PCT/US2005/043951.

International Search Report for International Patent application No. PCT/US2005/043951.

Erdelyi et al. "Generation of diffraction-free beams for applications in optical microlithography", J. Vac. Sci. Technol. B 15 (12), Mar./Apr. 1997, pp. 287-292.

International Search Report for International Patent application No. PCT/US2005/023664.

International Written Opinion for International Patent application No. PCT/US2005/023664.

Tearney et al., "Spectrally encoded miniature endoscopy" Optical Society of America; Optical Letters vol. 27, No. 6, Mar. 15, 2002; pp. 412-414.

Yelin et al., "Double-clad Fiber for Endoscopy" Optical Society of America; Optical Letters vol. 29, No. 20, Oct. 16, 2005; pp. 2408-2410.

International Search Report for International Patent application No. PCT/US2001/049704.

International Search Report for International Patent application No. PCT/US2004/039454.

International Written Opinion for International Patent application No. PCT/US2004/039454.

PCT International Preliminary Report on Patentability for International Application No. PCT/US2004/038404 dated Jun. 2, 2006.

Notice of Reasons for Rejection and English translation for Japanese Patent Application No. 2002-538830.

Office Action dated Aug. 24, 2006 for U.S. Appl. No. 10/137,749.

Barry Cense et al., "Spectral-domain polarization-sensitive optical coherence tomography at 850nm", Coherence Domain Optical Methods and Optical Coherence Tomography in Biomedicine IX, 2005, pp. 159-162.

A. Ymeti et al., "Integration of microfluidics with a four-channel integrated optical Young interferometer immunosensor", Biosensors and Bioelectronics, Elsevier Science Publishers, 2005, pp. 1417-1421.

PCT International Search Report for Application No. PCT/US2006/018865 filed May 5, 2006.
International Written Opinion for International Patent application No. PCT/US2006/018865 filed May 5, 2006.
John M. Poneros, "Diagnosis of Barrett's esophagus using optical coherence tomography", Gastrointestinal Endoscopy clinics of North America, 14 (2004) pp. 573-588.
P.F. Escobar et al., "Diagnostic efficacy of optical coherence tomography in the management of preinvasive and invasive cancer of uterine cervix and vulva", Int. Journal of Gynecological Cancer 2004, 14, pp. 470-474.
Ko T et al., "Ultrahigh resolution in vivo versus ex vivo OCT imaging and tissue preservation", Conference on Lasers and electro-optics, 2001, pp. 252-253.
Paul M. Ripley et al., "A comparison of Artificial Intelligence techniques for spectral classification in the diagnosis of human pathologies based upon optical biopsy", Journal of Optical Society of America, 2000, pp. 217-219.
Wolfgang Drexler et al., "Ultrahigh-resolution optical coherence tomography", Journal of Biomedical Optics Spie USA, 2004, pp. 47-74.
PCT International Search Report for Application No. PCT/US2006/016677 filed Apr. 28, 2006.
International Written Opinion for International Patent application No. PCT/US2006/016677 filed Apr. 28, 2006.
Office Action dated Nov. 13, 2006 for U.S. Appl. No. 10/501,268.
Office Action dated Nov. 20, 2006 for U.S. Appl. No. 09/709,162.
PCT International Search Report and Written Opinion for Application No. PCT/US2004/023585 filed Jul. 23, 2004.
Office Action dated Dec. 6, 2006 for U.S. Appl. No. 10/997,789.
Elliott, K. H. "The use of commercial CCD cameras as linear detectors in the physics undergraduate teaching laboratory", European Journal of Physics 19, 1998, pp. 107-117.
Lauer, V. "New approach to optical diffraction tomography yielding a vector equation of diffraction tomography and a novel tomographic microscope", Journal of Microscopy vol. 205, Issue 2, 2002, pp. 165-176.
Yu, P. et al. "Imaging of tumor necroses using full-frame optical coherence imaging", Proceedings of SPIE vol. 4956, 2003, pp. 34-41.
Zhao, Y. et al. "Three-dimensional reconstruction of in vivo blood vessels in human skin using phase-resolved optical Doppler tomography", IEEE Journal of Selected Topics in Quantum Electronics 7.6 (2001): 931-935.
Office Action dated Dec. 18, 2006 for U.S. Appl. No. 10/501,276.
Devesa, Susan S. et al. (1998) "Changing Patterns in the Incidence of Esophegeal and Gastric Carcinoma in the United States." *American Cancer Society* vol. 83, No. 10 pp. 2049-2053.
Barr, H et al. (2005) "Endoscopic Therapy for Barrett's Oesophaugs" *Gut* vol. 54:875-884.
Johnston, Mark H.(2005) "Technology Insight: Ablative Techniques for Barrett's Esophagus—Current and Emerging Trends" www.Nature.com/clinicalpractice/gasthep.
Falk, Gary W. et al. (1997) "Surveillance of Patients with Barrett's Esophagus for Dysplasia and Cancer with Ballon Cytology" *Gastrorenterology* vol. 112, pp. 1787-1797.
Sepchler, Stuart Jon. (1997) "Barrett's Esophagus: Should We Brush off this Balloning Problem?" *Gastroenterology* vol. 112, pp. 2138-2152.
Froehly, J. et al. (2003) "Multiplexed 3D Imaging Using Wavelength Encoded Spectral Interferometry: A Proof of Principle" *Optics Communications* vol. 222, pp. 127-136.
Kubba A.K. et al. (1999) "Role of p53 Assessment in Management of Barrett's Esophagus" *Digestive Disease and Sciences* vol. 44, No. 4. pp. 659-667.
Reid, Brian J. (2001) "p53 and Neoplastic Progression in Barrett's Esophagus" *The American Journal of Gastroenterology* vol. 96, No. 5, pp. 1321-1323.
Sharma, P. et al.(2003) "Magnification Chromoendoscopy for the Detection of Intestinal Metaplasia and Dysplasia in Barrett's Oesophagus" *Gut* vol. 52, pp. 24-27.
Kuipers E.J et al. (2005) "Diagnostic and Therapeutic Endoscopy" *Journal of Surgical Oncology* vol. 92, pp. 203-209.

Georgakoudi, Irene et al. (2001) "Fluorescence, Reflectance, and Light-Scattering Spectroscopy for Evaluating Dysplasia in Patients with Barrett's Esophagus" *Gastroenterology* vol. 120, pp. 1620-1629.
Adrain, Alyn L. et al. (1997) "High-Resolution Endoluminal Sonography is a Sensitive Modality for the Identification of Barrett's Meaplasia" *Gastrointestinal Endoscopy* vol. 46, No. 2, pp. 147-151.
Canto, Marcia Irene et al (1999) "Vital Staining and Barrett's Esophagus" *Gastrointestinal Endoscopy* vol. 49, No. 3, part 2, pp. 12-16.
Evans, John A. et al. (2006) "Optical Coherence Tomography to Identify Intramucosal Carcinoma and High-Grade Dysplasia in Barrett's Esophagus" *Clinical Gastroenterology and Hepatology* vol. 4, pp. 38-3.
Poneros, John M. et al. (2001) "Diagnosis of Specialized Intestinal Metaplasia by Optical Coherence Tomography" *Gastroenterology* vol. 120, pp. 7-12.
Ho, W. Y. et al. (2005) "115 KHz Tuning Repetition Rate Ultrahigh-Speed Wavelength-Swept Semiconductor Laser" *Optics Letters* col. 30, No. 23, pp. 3159-3161.
Brown, Stanley B. et al. (2004) "The Present and Future Role of Photodynamic Therapy in Cancer Treatment" *The Lancet Oncology* vol. 5, pp. 497-508.
Boogert, Jolanda Van Den et al. (1999) "Endoscopic Ablation Therapy for Barrett's Esophagua with High-Grade Dysplasia: A Review" *The American Journal of Gastroenterology* vol. 94, No. 5, pp. 1153-1160.
Sampliner, Richard E. et al. (1996) "Reversal of Barrett's Esophagus with Acid Suppression and Multipolar Electrocoagulation: Preliminary Results" *Gastrointestinal Endoscopy* vol. 44, No. 5, pp. 532-535.
Sampliner, Richard E. (2004) "Endoscopic Ablative Therapy for Barrett's Esophagus: Current Status" *Gastrointestinal Endoscopy* vol. 59, No. 1, pp. 66-69.
Soetikno, Roy M. et al. (2003) "Endoscopic Mucosal resection" *Gastrointestinal Endoscopy* vol. 57, No. 4, pp. 567-579.
Ganz, Robert A. et al. (2004) "Complete Ablation of Esophageal Epithelium with a Balloon-based Bipolar Electrode: A Phased Evaluation in the Porcine and in the Human Esophagus" *Gastrointestinal Endoscopy* vol. 60, No. 6, pp. 1002-1010.
Pfefer, Jorje at al. (2006) "Performance of the Aer-O-Scope, A Pneumatic, Self Propelling, Self Navigating Colonoscope in Animal Experiments" *Gastrointestinal Endoscopy* vol. 63, No. 5, pp. AB223.
Overholt, Bergein F. et al. (1999) "Photodynamic Therapy for Barrett's Esophagus: Follow-Up in 100 Patients" *Gastrointestinal Endoscopy* vol. 49, No. 1, pp. 1-7.
Vogel, Alfred et al. (2003) "Mechanisms of Pulsed Laser Ablation of Biological Tissues" *American Chemical Society* vol. 103, pp. 577-644.
McKenzie, A. L. (1990) "Physics of Thermal Processes in Laser-Tissue Interaction" *Phys. Med. Biol* vol. 35, No. 9, pp. 1175-1209.
Anderson, R. Rox et al. (1983) "Selective Photothermolysis" Precise Microsurgery by Selective Absorption of Pulsed Radiation *Science* vol. 220, No. 4596, pp. 524-527.
Jacques, Steven L. (1993) "Role of Tissue Optics and Pulse Duration on Tissue Effects During High-Power Laser Irradiation" *Applied Optics* vol. 32, No. 13, pp. 2447-2454.
Nahen, Kester et al. (1999) "Investigations on Acoustic On-Line Monitoring of IR Laser Ablation of burned Skin" *Lasers in Surgery and Medicine* vol. 25, pp. 69-78.
Jerath, Maya R. et al. (1993) "Calibrated Real-Time Control of Lesion Size Based on Reflectance Images" *Applied Optics* vol. 32, No. 7, pp. 1200-1209.
Jerath, Maya R. et al (1992) "Dynamic Optical Property Changes: Implications for Reflectance Feedback Control of Photocoagulation" *Journal of Photochemical,.Photobiology. B: Biol* vol. 16, pp. 113-126.
Deckelbaum, Lawrence I. (1994) "Coronary Laser Angioplasty" *Lasers in Surgery and Medicine* vol. 14, pp. 101-110.
Kim, B.M. et al. (1998) "Optical Feedback Signal for Ultrashort Laser Pulse Ablation of Tissue" *Applied Surface Science* vol. 127-129, pp. 857-862.

Brinkman, Ralf et al. (1996) "Analysis of Cavitation Dynamics During Pulsed Laser Tissue Ablation by Optical On-Line Monitoring" *IEEE Journal of Selected Topics in Quantum Electronics* vol. 2, No. 4, pp. 826-835.
Whelan, W.M. et al. (2005) "A novel Strategy for Monitoring Laser Thermal Therapy Based on Changes in Optothermal Properties of Heated Tissues" *International Journal of Thermophysics* vol. 26, No. 1, pp. 233-241.
Thomsen, Sharon et al. (1990) "Microscopic Correlates of Macroscopic Optical Property Changes During Thermal Coagulation of Myocardium" *SPIE* vol. 1202, pp. 2-11.
Khan, Misban Huzaira et al. (2005) "Intradermally Focused Infrared Laser Pulses: Thermal Effects at Defined Tissue Depths" *Lasers in Surgery and Medicine* vol. 36, pp. 270-280.
Neumann, R.A. et al. (1991) "Enzyme Histochemical Analysis of Cell Viability After Argon Laser-Induced Coagulation Necrosis of the Skin" *Journal of the American Academy of Dermatology* vol. 25, No. 6, pp. 991-998.
Nadkarni, Seemantini K. et al (2005) "Charaterization of Atherosclerotic Plaques by Laser Speckle Imaging" *Circulation* vol. 112, pp. 885-892.
Zimnyakov, Dmitry A. et al (2002) "Speckle-Contrast Monitoring of Tissue Thermal Modification" *Applied Optics* vol. 41, No. 28, pp. 5989-5996.
Morelli, J.G., et al (1986) "Tunable Dye Laser (577 nm) Treatment of Port Wine Stains" *Lasers in Surgery and Medicine* vol. 6, pp. 94-99.
French, P.M.W. et al. (1993) "Continuous-wave Mode-Locked $Cr^{4+}$: YAG Laser" *Optics Letters* vol. 18, No. 1, pp. 39-41.
Sennaroglu, Alphan at al. (1995) "Efficient Continuous-Wave Chromium-Doped YAG Laser" *Journal of Optical Society of America* vol. 12, No. 5, pp. 930-937.
Bouma, B et al. (1994) "Hybrid Mode Locking of a Flash-Lamp-Pumped Ti: $Al_2O_3$ Laser" *Optics Letters* vol. 19, No. 22, pp. 1858-1860.
Bouma, B et al. (1995) "High Resolution Optical Coherence Tomography Imaging Using a Mode-Locked Ti: $Al_2O_3$ Laser Source" *Optics Letters* vol. 20, No. 13, pp. 1486-1488.
Fernández, Cabrera Delia et al. "Automated detection of retinal layer structures on optical coherence tomography images", *Optics Express* vol. 13, No. 25, Oct. 4, 2005, pp. 10200-10216.
Ishikawa, Hiroshi et al. "Macular Segmentation with optical coherence tomography", Investigative Ophthalmology & Visual Science, vol. 46, No. 6, Jun. 2005, pp. 2012-2017.
Hariri, Lida P. et al. "Endoscopic Optical Coherence Tomography and Laser-Induced Fluorescence Spectroscopy in a Murine Colon Cancer Model", Laser in Surgery and Medicine, vol. 38, 2006, pp. 305-313.
PCT International Search Report and Written Opinion for Application No. PCT/US2006/031905 dated May 3, 2007.
PCT International Search Report and Written Opinion for Application No. PCT/US2007/060481 dated May 23, 2007.
PCT International Search Report and Written Opinion for Application No. PCT/US2007/060717 dated May 24, 2007.
PCT International Search Report and Written Opinion for Application No. PCT/US2007/060319 dated Jun. 6, 2007.
D. Yelin et al., "Three-dimensional imaging using spectral encoding heterodyne interferometry", Optics Letters, Jul. 15, 2005, vol. 30, No. 14, pp. 1794-1796.
Akiba, Masahiro et al. "En-face optical coherence imaging for three-dimensional microscopy", SPIE, 2002, pp. 8-15.
Office Action dated Aug. 10, 2007 for U.S. Appl. No. 10/997,789.
Office Action dated Feb. 2, 2007 for U.S. Appl. No. 11/174,425.
PCT International Search Report and Written Opinion for Application No. PCT/US2007/060657 dated Aug. 13, 2007.
Joo, Chulmin et al., Spectral-domain optical coherence phase microscopy for quantitative phase-contrast imaging, Optics Letters, Aug. 15, 2005, vol. 30, No. 16, pp. 2131-2133.
Guo, Bujin et al., "Laser-based mid-infrared reflectance imaging of biological tissues", Optics Express, Jan. 12, 2004, vol. 12, No. 1, pp. 208-219.
Office Action dated Mar. 28, 2007 for U.S. Appl. No. 11/241,907.
Office Action dated May 23, 2007 for U.S. Appl. No. 10/406,751.
Office Action dated May 23, 2007 for U.S. Appl. No. 10/551,735.

PCT International Search Report and Written Opinion for Application No. PCT/US2007/061815 dated Aug. 2, 2007.
Sir Randall, John et al., "Brillouin scattering in systems of biological significance", Phil. Trans. R. Soc. Lond. A 293, 1979, pp. 341-348.
Takagi, Yasunari, "Application of a microscope to Brillouin scattering spectroscopy", Review of Scientific Instruments, No. 12, Dec. 1992, pp. 5552-5555.
Lees, S. et al., "Studies of Compact Hard Tissues and Collagen by Means of Brillouin Light Scattering", Connective Tissue Research, 1990, vol. 24, pp. 187-205.
Berovic, N. "Observation of Brillion scattering from single muscle fibers", European Biophysics Journal, 1989, vol. 17, pp. 69-74.
PCT International Search Report and Written Opinion for Application No. PCT/US2007/062465 dated Aug. 8, 2007.
Pyhtila John W. et al., "Rapid, depth-resolved light scattering measurements using Fourier domain, angle-resolved low coherence interferometry", Optics Society of America, 2004.
Pyhtila John W. et al., "Determining nuclear morphology using an improved angle-resolved low coherence interferometry system", Optics Express, Dec. 15, 2003, vol. 11, No. 25, pp. 3473-3484.
Desjardins A.E., et al., "Speckle reduction in OCT using massively-parallel detection and frequency-domain ranging", Optics Express, May 15, 2006, vol. 14, No. 11, pp. 4736-4745.
Nadkarni, Seemantini K., et al., "Measurement of fibrous cap thickness in atherosclerotic plaques by spatiotemporal analysis of laser speckle images", Journal of Biomedical Optics, vol. 11 Mar./Apr. 2006, pp. 021006-1-021006-8.
PCT International Search Report and Written Opinion for Application No. PCT/US2007/066017 dated Aug. 30, 2007.
Yamanari M. et al., "Polarization sensitive Fourier domain optical coherence tomography with continuous polarization modulation", Proc. of SPIE, vol. 6079, 2006.
Zhang Jun et al., "Full range polarization-sensitive Fourier domain optical coherence tomography", Optics Express, Nov. 29, 2004, vol. 12, No. 24, pp. 6033-6039.
European Patent Office Search report for Application No. 01991092.6-2305 dated Jan. 12, 2006.
PCT International Search Report and Written Opinion for Application No. PCT/US2007/060670 dated Sep. 21, 2007.
Office Action dated Oct. 11, 2007 for U.S. Appl. No. 11/534,095.
Office Action dated Oct. 9, 2007 for U.S. Appl. No. 09/709,162.
Notice of Allowance dated Oct. 3, 2007 for U.S. Appl. No. 11/225,840.
Siavash Yazdanfar et al., "In Vivo imaging in blood flow in human retinal vessels using color Doppler optical coherence tomography", SPIE, 1999 vol. 3598, pp. 177-184.
Office Action dated Oct. 30, 2007 for U.S. Appl. No. 11/670,069.
Tang C. L. et al., "Wide-band electro-optical tuning of semiconductor lasers", Applied Physics Letters, vol. 30, No. 2, Jan. 15, 1977, pp. 113-116.
Tang C. L. et al., "Transient effects in wavelength-modulated dye lasers", Applied Physics Letters, vol. 26, No. 9, May 1, 1975, pp. 534-537.
Telle M. John, et al., "Very rapid tuning of cw dye laser", Applied Physics Letters, vol. 26, No. 10, May 15, 1975, pp. 572-574.
Telle M. John, et al., "New method for electro-optical tuning of tunable lasers", Applied Physics Letters, vol. 24, No. 2, Jan. 15, 1974, pp. 85-87.
Schmitt M. Joseph et al. "OCT elastography: imaging microscopic deformation and strain of tissue", Optics Express, vol. 3, No. 6, Sep. 14, 1998, pp. 199-211.
M. Gualini Muddassir et al., "Recent Advancements of Optical Interferometry Applied to Medicine", IEEE Transactions on Medical Imaging, vol. 23, No. 2, Feb. 2004, pp. 205-212.
Maurice L. Roch et al. "Noninvasive Vascular Elastography: Theoretical Framework", IEEE Transactions on Medical Imaging, vol. 23, No. 2, Feb. 2004, pp. 164-180.
Kirkpatrick J. Sean et al. "Optical Assessment of Tissue Mechanical Properties", Proceedings of the SPIE—The International Society for Optical Engineering SPIE—vol. 4001, 2000, pp. 92-101.

Lisauskas B. Jennifer et al., "Investigation of Plaque Biomechanics from Intravascular Ultrasound Images using Finite Element Modeling", Proceedings of the 19th International Conference—IEEE Oct. 30-Nov. 2, 1997, pp. 887-888.
Parker K. J. et al., "Techniques for Elastic Imaging: A Review", IEEE Engineering in Medicine and Biology, Nov./Dec. 1996, pp. 52-59.
European Patent Office Search Report for Application No. 05791226.3.
Dubois Arnaud et al., "Ultrahigh-resolution OCT using white-light interference microscopy", Proceedings of SPIE, 2003, vol. 4956, pp. 14-21.
Office Action dated Jan. 3, 2008 for U.S. Appl. No. 10/997,789.
Office Action dated Dec. 21, 2007 for U.S. Appl. No. 11/264,655.
Office Action dated Dec. 18, 2007 for U.S. Appl. No. 11/288,994.
Office Action dated Jan. 10, 2008 for U.S. Appl. No. 11/435,228.
Office Action dated Jan. 10, 2008 for U.S. Appl. No. 11/410,937.
Office Action dated Jan. 11, 2008 for U.S. Appl. No. 11/445,990.
Office Action dated Feb. 4, 2008 for U.S. Appl. No. 10/861,179.
PCT International Search Report and Written Opinion for Application No. PCT/US2007/061463 dated Jan. 23, 2008.
PCT International Search Report and Written Opinion for Application No. PCT/US2007/061481 dated Mar. 17, 2008.
PCT International Search Report and Written Opinion for Application No. PCT/US2007/078254 dated Mar. 28, 2008.
Sadhwani, Ajay et al., "Determination of Teflon thickness with laser speckle I. Potential for burn depth diagnosis", Optical Society of America, 1996, vol. 35, No. 28, pp. 5727-5735.
C.J. Stewart et al., "A comparison of two laser-based methods for determination of burn scar perfusion: Laser Doppler versus laser speckle imaging", Elsevier Ltd., 2005, vol. 31, pp. 744-752.
G. J. Tearney et al., "Atherosclerotic plaque characterization by spatial and temporal speckle pattern analysis", CLEO 2001, vol. 56, pp. 307-307.
PCT International Search Report for Application No. PCT/US2007/068233 dated Feb. 21, 2008.
PCT International Search Report for Application No. PCT/US2007/060787 dated Mar. 18, 2008.
Statement under Article 19 and Reply to PCT Written Opinion for PCT International Application No. PCT/US2005/043951 dated Jun. 6, 2006.
PCT International Preliminary Report on Patentability for Application No. PCT/US2005/043951 dated Jun. 7, 2007.
R. Haggitt et al., "Barrett's Esophagus Correlation Between Mucin Histochemistry, Flow Cytometry, and Histological Diagnosis for Predicting Increased Cancer Risk," Apr. 1988, American Journal of Pathology, vol. 131, No. 1, pp. 53-61.
R.H. Hardwick et al., (1995) "c-erbB-2 Overexpression in the Dysplasia/Carcinoma Sequence of Barrett's Oesophagus," Journal of Clinical Pathology, vol. 48, No. 2, pp. 129-132.
W. Polkowski et al, (1998) Clinical Decision making in Barrett's Oesophagus can be supported by Computerized Immunoquantitation and Morphometry of Features Associated with Proliferation and Differentiation, Journal of pathology, vol. 184, pp. 161-168.
J.R. Turner et al., MN Antigen Expression in Normal Preneoplastic, and Neoplastic Esophagus: A Clinicopathological Study of a New Cancer-Associated Biomarker,: Jun. 1997, Human Pathology, vol. 28, No. 6, pp. 740-744.
D.J. Bowery et al., (1999) "Patterns of Gastritis in Patients with Gastro-Oesophageal Reflux Disease,", Gut, vol, 45, pp. 798-803.
O'Reich et al., (2000) "Expression of Oestrogen and Progesterone Receptors in Low-Grade Endometrial Stromal Sarcomas,", British Journal of Cancer, vol. 82, No. 5, pp. 1030-1034.
M.I. Canto et al., (1999) "Vital Staining and Barrett's Esophagus," Gastrointestinal Endoscopy, vol. 49, No. 3, Part 2, pp. S12-S16.
S. Jackle et al., (2000) "In Vivo Endoscopic Optical Coherence Tomography of the Human Gastrointestinal Tract-Toward Optical Biopsy," Encoscopy, vol. 32, No. 10, pp. 743-749.
E. Montgomery et al., "Reproducibility of the Diagnosis of Dysplasia in Barrett Esophagus: A Reaffirmation," Apr. 2001, Human Pathology, vol. 32, No. 4, pp. 368-378.
H. Geddert et al., "Expression of Cyclin B1 in the Metaplasia-Dysphasia-Carcinoma Sequence of Barrett Esophagus," Jan. 2002, Cancer, vol. 94, No. 1, pp. 212-218.

P. Pfau et al., (2003) "Criteria for the Diagnosis of Dysphasia by Endoscopic Optical Coherence Tomography," Gastrointestinal Endoscopy, vol. 58, No. 2, pp. 196-2002.
R. Kiesslich et al., (2004) "Confocal Laser Endoscopy for Diagnosing Intraepithelial Neoplasias and Colorectal Cancer in Vivo," Gastroenterology, vol. 127, No. 3, pp. 706-713.
X. Qi et al., (2004) "Computer Aided Diagnosis of Dysphasia in Barrett's Esophagus Using Endoscopic Optical Coherence Tomography," SPIE, Coherence Domain Optical Methods and Optical Coherence Tomography in Biomedicine VIII. Proc. of Conference on., vol. 5316, pp. 33-40.
Seltzer et al., (1991) "160 nm Continuous Tuning of a MQW Laser in an External Cavity Across the Entire 1.3 μm Communications Window," Electronics Letters, vol. 27, pp. 95-96.
Office Action dated Jan. 25, 2010 for U.S. Appl. No. 11/537,048.
International Search Report dated Jan. 27, 2010 for PCT/US2009/050553.
International Search Report dated Jan. 27, 2010 for PCT/US2009/047988.
International Search Report dated Feb. 23, 2010 for U.S. Appl. No. 11/445,131.
Office Action dated Mar. 18, 2010 of U.S. Appl. No. 11/844,454.
Office Action dated Apr. 8, 2010 of U.S. Appl. No. 11/414,564.
Japanese Office Action dated Apr. 13, 2010 for Japanese Patent application No. 2007-515029.
International Search Report dated May 27, 2010 for PCT/US2009/063420.
Office Action dated May 28, 2010 for U.S. Appl. No. 12/015,642.
Office Action dated Jun. 2, 2010 for U.S. Appl. No. 12/112,205.
Office Action dated Jul. 7, 2010 for U.S. Appl. No. 11/624,277.
Montag Ethan D., "Parts of the Eye" online textbook for JIMG 774: Vision & Psycophysics, download on Jun. 23, 2010 from http://www.cis.rit.edu/people/faculty/montag/vandplite/pages/chap_8/ch8p3.html.
Office Action dated Jul. 16, 2010 for U.S. Appl. No. 11/445,990.
Office Action dated Jul. 20, 2010 for U.S. Appl. No. 11/625,135.
Office Action dated Aug. 5, 2010 for U.S. Appl. No. 11/623,852.
Chinese office action dated Aug. 4, 2010 for CN 200780005949.9.
Chinese office action dated Aug. 4, 2010 for CN 200780016266.3.
Zhang et al., "Full Range Polarization-Sensitive Fourier Domain Optical Coherence Tomography" Optics Express, Nov. 29, 2004, vol. 12, No. 24.
Office Action dated Aug. 27, 2010 for U.S. Appl. No. 11/569,790.
Office Action dated Aug. 31, 2010 for U.S. Appl. No. 11/677,278.
Office Action dated Sep. 3, 2010 for U.S. Appl. No. 12/139,314.
Reference cited in Office Action dated Jul. 7, 2010 for U.S. Appl. No. 11/624,277.
Reference cited in Office Action dated Jul. 16, 2010 for U.S. Appl. No. 11/445,990.
Reference cited in Office Action dated Jul. 20, 2010 for U.S. Appl. No. 11/625,135.
Reference cited in Office Action dated Aug. 5, 2010 for U.S. Appl. No. 11/623,852.
Reference cited in Chinese Office Action dated Aug. 4, 2010 for CN 200780005949.9.
Reference cited in Chinese Office Action dated Aug. 4, 2010. For CN 200780016266.3.
Reference cited in Office Action dated Aug. 27, 2010 for U.S. Appl. No. 11/569,790.
Reference cited in Office Action dated Aug. 31, 2010 for U.S. Appl. No. 11/677,278.
Reference cited in Office Action dated Sep. 3, 2010 for U.S. Appl. No. 12/139,314.
Notice of Reasons for Rejection dated May 5, 2010 for JP 2006-515266.
Office Action dated Jun. 4, 2010 for U.S. Appl. No. 11/285,301.
Office Action dated Jun. 8, 2010 for U.S. Appl. No. 12/201,816.
Chinese Office Action dated Jun. 8, 2010 for Chinese application No. 200780031332.4.
Office Action dated Jun. 10, 2010 for U.S. Appl. No. 11/505,700.
European Office Action dated Jun. 11, 2010 for EP 07761877.5.
European Office Action dated Jul. 14, 20.10 for EP 06751266.5.
Office Action dated Aug. 27, 2010 for U.S. Appl. No. 11/569,790.

Office Action dated Sep. 3, 2010 for U.S. Appl. No. 12/139,314.
Office Action dated Sep. 29, 2010 for U.S. Appl. No. 11/672,571.
International Search Report and Written Opinion dated Aug. 31, 2010 for PCT/US2010/022034.
Office Action dated Oct. 20, 2010 for U.S. Appl. No. 12/015,642.
Office Action dated Oct. 25, 2010 for U.S. Appl. No. 11/622,854.
Office Action dated Oct. 26, 2010 for U.S. Appl. No. 11/211,482.
Office Action dated Oct. 27, 2010 for U.S. Appl. No. 11/744,287.
Office Action dated Nov. 15, 2010 for U.S. Appl. No. 12/795,529.
Office Action dated Jul. 7, 2010 for U.S. Appl. No. 11/624,277.
Montag Ethan D., "Parts of the Eye" online textbook for JIMG 774: Vision & Psycophysics, download on Jun. 23, 2010 from http://www.cis.rit.edu/people/faculty/montag/vandplite/pages/chap_8/ch8p3.html.
Office Action dated Jul. 16, 2010 for U.S. Appl. No. 11/445,990.
Office Action dated Jul. 20, 2010 for U.S. Appl. No. 11/625,135.
Office Action dated Aug. 5, 2010 for U.S. Appl. No. 11/623,852.
Chinese office action dated Aug. 4, 2010 for CN 200780005949.9.
Chinese office action dated Aug. 4, 2010 for CN 200780016266.3.
Swan et al., "Toward Nanometer-Scale Resolution in Fluorescence Microscopy using Spectral Self-Inteference"' IEEE Journal. Selected Topics in Quantum Electronics 9 (2) 2003, pp. 294-300.
Moiseev et al., "Spectral Self-Interference Fluorescence Microscopy", J. Appl. Phys. 96 (9) 2004, pp. 5311-5315.
Hendrik Verschueren, "Interference Reflection Microscopy in Cell Biology", J. Cell Sci. 75, 1985, pp. 289-301.
Park et al., "Diffraction Phase and Fluorescence Microscopy", Opt. Expr. 14 (18) 2006, pp. 8263-8268.
Swan et al. "High Resolution Spectral Self-Interference Fluorescence Microscopy", Proc. SPIE 4621, 2002, pp. 77-85.
Sanchez et al., "Near-Field Fluorscence Microscopy Based on Two-Photon Excvitation with Metal Tips", Phys. Rev. Lett. 82 (20) 1999, pp. 4014-4017.
Wojtkowski, Maciej, Ph.D. "Three-Dimensional Retinal Imaging with High-Speed Ultrahigh-Resolution Optical Coherence Tomography" Ophthalmology, Oct. 2005, 112(10): 1734-1746.
Vaughan, J.M. et al., "Brillouin Scattering, Density and Elastic Properties of the Lens and Cornea of the Eye", Nature, vol. 284, Apr. 3, 1980, pp. 489-491.
Hess, S.T. et al. "Ultra-high Resolution Imaging by Fluorescence Photoactivation Localization Microscopy" Biophysical Journal vol. 91, Dec. 2006, 4258-4272.
Fernandez-Suarez, M. et al., "Fluorescent Probes for Super-Resolution Imaging in Living Cells" Nature Reviews Molecular Cell Biology vol. 9, Dec. 2008.
Yong Zhao et al: "Virtual Data Grid Middleware Services for Data-Intensive Science", Concurrency and Computation: Practice and Experience, Wiley, London, GB, Jan. 1, 2000, pp. 1-7, pp. 1532-0626.

* cited by examiner

APPARATUS AND METHOD FOR CROSS AXIS PARALLEL SPECTROSCOPY

FIELD OF THE INVENTION

The present invention relates to apparatus and method for cross axis parallel spectroscopy measuring and filtering the spectrum of electromagnetic radiation using cross-axis multiple diffractive elements in series.

BACKGROUND INFORMATION

Optical dispersive elements, such as diffraction gratings, prisms, and VIPA etalons, have been used in the art to separate spectrum of an input beam by dispersing its spectral components into different spatial directions.

The spatial separation of light into its spectral components facilitates various operation on the incoming radiation: (a) filtering the spectrum of said radiation by means of masks, apertures, etc., (b) tailoring the spectrum of said radiation by means of spatial light modulators, wave-plates etc., and (c) analyzing such spectrum by building light spectrometers in conjunction with a detector array or a CCD camera.

The quality of spectral manipulation or characterization can be measured by several parameters depending on the specific application and working conditions. The resolution of a device can indicate the minimal spectral separation that the device can detect or address; the throughput efficiency denotes the fraction of incoming light that is not lost; the sensitivity indicates the minimal power of light that is needed for the instrument to measure it or to work on it.

Among the various characteristics of a spectrometer, one that may be important for many applications is the dynamic range, or the ratio between the largest and the smallest measurable signal, in other words, the ability of the spectrometer to simultaneously measure signals of different strength. Ultimately, stray light in the spectrometer; extinction of the diffractive elements and dynamic range of the photodetecting device are the limiting factors for the spectrometer's dynamic range.

In a preferable device, when a monochromatic light passes through the diffractive element, it is likely redirected toward one direction which will correspond to the exact reading of its frequency (or wavelength); in practice, a small part of the incoming light always spreads in directions other than the ideal one. Extinction is the ratio between the intensity of the fraction of light emitted in a specific wrong direction and the intensity of the peak of light which is directed in the correct direction. Poor extinction may result in what is called, crosstalk, e.g., the unwanted leakage of a frequency component into a wrong measurement channel.

Traditionally, for spectral measurements that use high dynamic range and low crosstalk, monochromators have represented the only choice. In monochromators, one narrow-band spectral component is measured at a time with a high dynamic range detector and a narrow slit minimizes instrumental stray light. Most importantly, monochromators can be easily cascaded to have multiple stages of spectral dispersion; at each stage, blocking masks and further spectral dispersion remove leakage due to imperfect gratings or stray light noise. Monochromators, though, are inherently slow because the measurement is performed sequentially. In addition, while their working principle is suitable for beam analysis, they cannot be used for the manipulation of the light spectrum.

For most applications in spectroscopy, it would be desirable to use spectrometers, where all the frequency components are measured in parallel and no moving parts are present. Unfortunately, parallel detection does not lend itself to multiple-stage extension for leakage reduction, prevents blocking stray light, and, employs array-detectors with limited dynamic range (typically, e.g., about 30-35 dB). As a result, spectrometers, although faster and more stable than monochromators, have not been competitive for high dynamic range applications.

Accordingly, there may be a need to overcome at least some of the deficiencies described herein above.

OBJECTS AND SUMMARY OF EXEMPLARY EMBODIMENTS

To address and/or overcome at least some of the above-described problems and/or deficiencies, method and apparatus can be provided to measure, tailor, and filter the spectrum of light. Exemplary embodiments of the present invention can utilize cross-axis multiple diffractive elements, e.g., prisms, non-echelle-type linear gratings and virtually imaged phased array (VIPA).

It is known in the art that a cascaded multiple grating, as opposed to a single grating, can improve the resolution and dynamic range of measurement. However, the conventional systems and devices are generally limited to scanning instruments, e.g., optical spectrum analyzer or monochromator, where individual narrowband spectral component are measured one at a time, and the spectrum is measured by scanning a pinhole or rotating the grating.

Certain attempts to extend the concept of cascaded diffractive elements to parallel spectrometers have been made. However, the configurations may be restricted to very specific type of dispersive elements and/or very specific configuration schemes.

One exemplary embodiment of the present invention can utilize a configuration based on cross-axis cascading and can be widely used in spectrometers, where many spectral components can be measured simultaneously or for spectral manipulation to address each spectral component in parallel.

In another exemplary embodiment of the present invention, two or more gratings, or other dispersive elements, can be cascaded. In between thereof, an image rotator (e.g., a Dove Prism) can change the orientation of the dispersive axis to facilitate convenient cascading. In a further exemplary embodiment, an improvement in dynamic range by more than an order of magnitude, compared to prior arts can be obtained.

In still another exemplary embodiment, it is possible to utilize VIPA etalons as dispersive elements to construct an extremely high-resolution spectrometer. VIPA etalons have a particular likely property of not changing significantly the direction of propagation of the beam of light. Thus, VIPA etalons may be used conveniently with or without image rotation arrangement.

In yet another exemplary embodiment, flat planar gratings may be used without image rotation between them but with orthogonal optical axis.

Moreover, an exemplary embodiment of a method according to the present invention can be provided to take advantage of the full dynamic range of the spectrometer despite possible limitations imposed by the dynamic range of the array photodetector.

Optical spectrometers have a well-established significant-sized market. Exemplary embodiments of the present invention can be adapted into commercial instruments.

According to another exemplary embodiment of the present invention, apparatus and method to measure and filter the spectrum of electro-magnetic radiation using multiple dispersive elements, such as diffraction gratings or VIPA etalons, concatenated in a cross-axis orthogonal arrangement can be provided. The exemplary embodiment can be useful in spectroscopy where all the spectral components are measured in parallel simultaneously with high spectral resolution and high dynamic range. In one further exemplary embodiment, two or more gratings may be cascaded with dove prisms in between to improve the spectrometer dynamic range by more than an order of magnitude, compared to prior arts. In another exemplary embodiment, multiple VIPA etalons may be used to construct an extremely high-resolution spectrometer. An exemplary embodiment of the procedure according to the present invention can be provided to achieve a high dynamic range of, e.g., greater than about 70 dB by addressing the issues with a CCD camera.

Another exemplary embodiment of the apparatus and method according to the present invention can be provided. For example, it is possible to receive at least one first electro-magnetic radiation and generate at least one second electro-magnetic radiation using at least one first spectral separating arrangement. A first spectrum of the second electro-magnetic radiation can be dispersed along at least one first dispersive axis with respect to a propagation direction of the second electro-magnetic radiation. In addition, it is possible to, using at least one second arrangement, receive the second electro-magnetic radiation and produce at least one third electromagnetic radiation having a second spectrum dispersed along at least one second dispersive axis with respect to a propagation direction of the third electromagnetic radiation. The orientations of the respective first and second dispersive axes can be different from one another. The first and/or second dispersive arrangements can be VIPA etalon arrangements.

Further, it is possible to receive at least one third electro-magnetic radiation and generate at least one fourth electro-magnetic radiation using at least one third spectral separating arrangement. A third spectrum of the at least one fourth electro-magnetic radiation may be dispersed along at least one third dispersive axis with respect to a propagation direction of the fourth electro-magnetic radiation. Orientations of the respective second and third dispersive axes can be different from one another. The orientations of the respective first and third dispersive axes may also be different from one another. An angle between the first and second dispersive axes can be approximately 90 degrees. The second arrangement may be an optical arrangement which can rotate an orientation of the spectrum of the second electromagnetic radiation. The optical arrangement can includes a Dove-type prism, an Abbe prism, a Pechan prism and/or a plurality of rotating mirrors.

In addition, the first spectral separating arrangement may include a grating, a prism and/or a VIPA etalon. The third spectral separating arrangement can include a grating, a prism and/or a VIPA etalon. It is also possible to detect at least one portion of the second spectrum and/or of the third spectrum using at least one detector-array arrangement. The detector-array arrangement may include a linear CCD array. It is possible to modify at least one property of at least one portion of the second electro-magnetic radiation, third and/or fourth electro-magnetic radiation using a spatial modification arrangement. In addition, it is possible to receive further radiation effected by the modified portion using at least one detector-array arrangement. The spatial modification arrangement can include at least one slit.

According to still another exemplary embodiment of the present invention, an arrangement and method can be provided. For example, it is possible to receive at least one first electro-magnetic radiation and generate at least one second electro-magnetic radiation using a first VIPA etalon arrangement. A first spectrum of the second electro-magnetic radiation can be dispersed along at least one first dispersive axis with respect to a propagation direction of the second electro-magnetic radiation. Further, it is possible to receive at least one third electro-magnetic radiation associated with the second electro-magnetic radiation and generate at least one fourth electro-magnetic radiation using a second VIPA etalon arrangement. A second spectrum of the fourth electro-magnetic radiation may be dispersed along at least one second dispersive axis with respect to a propagation direction of the at least one fourth electro-magnetic radiation. The orientations of the first and second dispersive axes can be different from one another.

It is possible to utilize at least one third optical arrangement to receive the second electro-magnetic radiation and generate the at least one third electro-magnetic radiation. The third optical arrangement may include a lens arrangement, at least one slit and/or a Dove prism. Further, at least one detector-array arrangement can be used to detect at least one portion of the second spectrum. At least one dispersive arrangement can also be used to receive at least one fifth electromagnetic radiation associated with the fourth electromagnetic radiation, and generate a third spectrum.

According to still another exemplary embodiment of the present invention, a method for measuring an electro-magnetic radiation can be provided. For example, the electro-magnetic radiation can be spatially separated, which can then be detected. Further, it is possible to simultaneously measure at least two components of the spectrum of the spatially separated electro-magnetic radiation each time at different amplitudes of the electro-magnetic radiation to produce output information. Then, a resultant spectrum signal associated with electro-magnetic radiation can be generated based on the output information. For example, a ratio between maximum and minimum values measured for the resultant spectrum signal can be greater than about 50 dB.

According to a still further arrangement, an apparatus and method can be provided. For example, it is possible to receive at least one first electro-magnetic radiation and generate at least one second electro-magnetic radiation using a first dispersive arrangement. A first spectrum of the second electro-magnetic radiation may be dispersed along at least one first dispersive axis with respect to a propagation direction of the second electro-magnetic radiation. The first dispersive arrangement can include a flat planar grating. It is possible to utilize a second dispersive arrangement to receive at least one third electro-magnetic radiation associated with the second electro-magnetic radiation and to generate at least one fourth electro-magnetic radiation. A second spectrum of the fourth electro-magnetic radiation can be dispersed along at least one second dispersive axis with respect to a propagation direction of the fourth electro-magnetic radiation. The angle between the first and second dispersive axes may be greater than about 15 degrees. The second dispersive arrangement may include a flat planar grating.

BRIEF DESCRIPTION OF THE DRAWINGS

Further objects, features and advantages of the present invention will become apparent from the following detailed description taken in conjunction with the accompanying figures showing illustrative embodiments of the present invention, in which.

Figure 1:
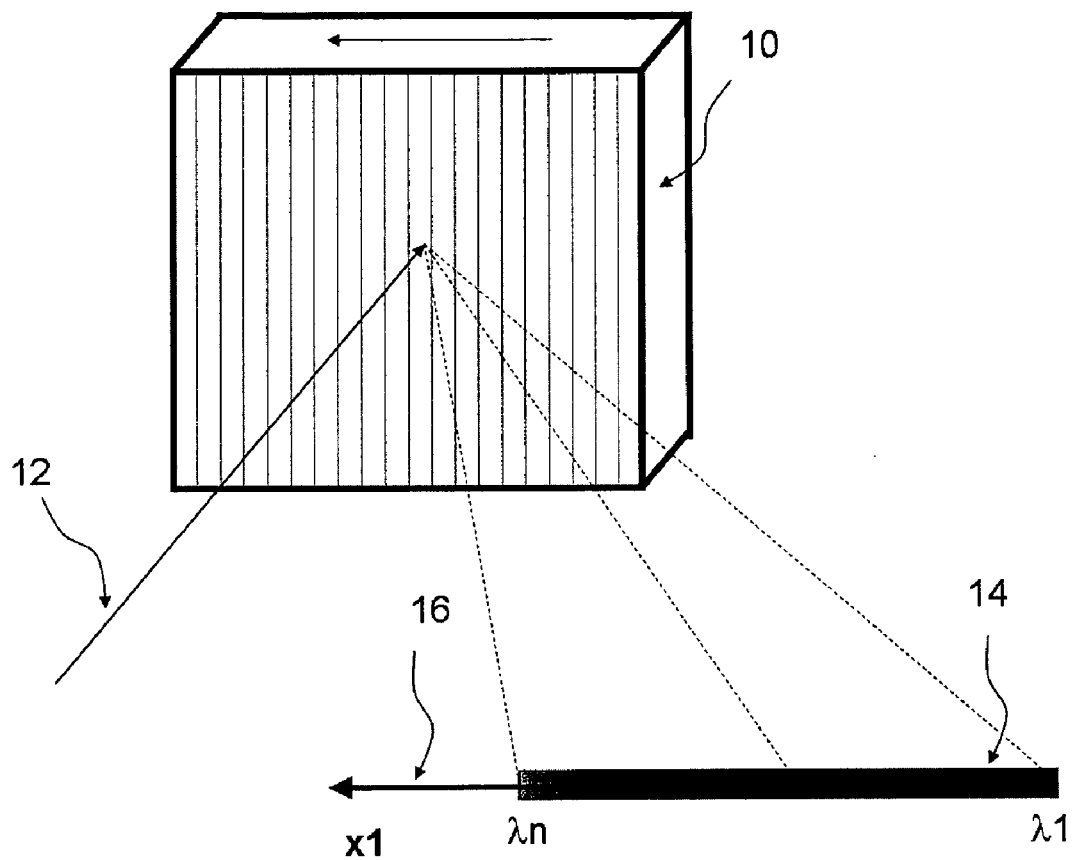
FIG. 1 is an illustration of an exemplary principle of a conventional grating spectrometer.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

It may be known by those having ordinary skill in the art that a diffraction grating can provide angular dispersion; the exiting beam has its different wavelengths emerging at different angles. FIG. 1 illustrates a schematic diagram of an exemplary principle of conventional gratings. For example, a linear ruled grating 10 receives an input electro-magnetic radiation beam 12, and produces an output electro-magnetic radiation beam 14. The spectrum of the output beam 14 is dispersed along a spatial axis 16.

The exemplary output beam angle with respect to the grating normal can be provided by:

$$\beta(\lambda)=\sin^{-1}[\sin\alpha-m\lambda/p]. \quad (1)$$

For example, $\beta$ is the output beam angle with respect to the grating normal, $\alpha$ is the input beam angle, m denotes the diffraction order, $\lambda$ is the optical wavelength, and p is the grating pitch. The 0-th order (n=0) generally corresponds to mirror-like reflection. When p>$\lambda$, multiple diffraction orders can be generated for a given wavelength. With appropriate choice of the parameters, it is possible to produce only one diffraction order (n=1). A typical echelle grating with p>>$\lambda$, produces 10-100 diffraction orders. If the input beam has a spectral bandwidth greater than the free spectral range (FSR) of echelle grating, the output orders are likely spatially superimposed on each other.

Previously, limited attempts to cascade dispersive elements in spectrometers have been made.

Figure 2:
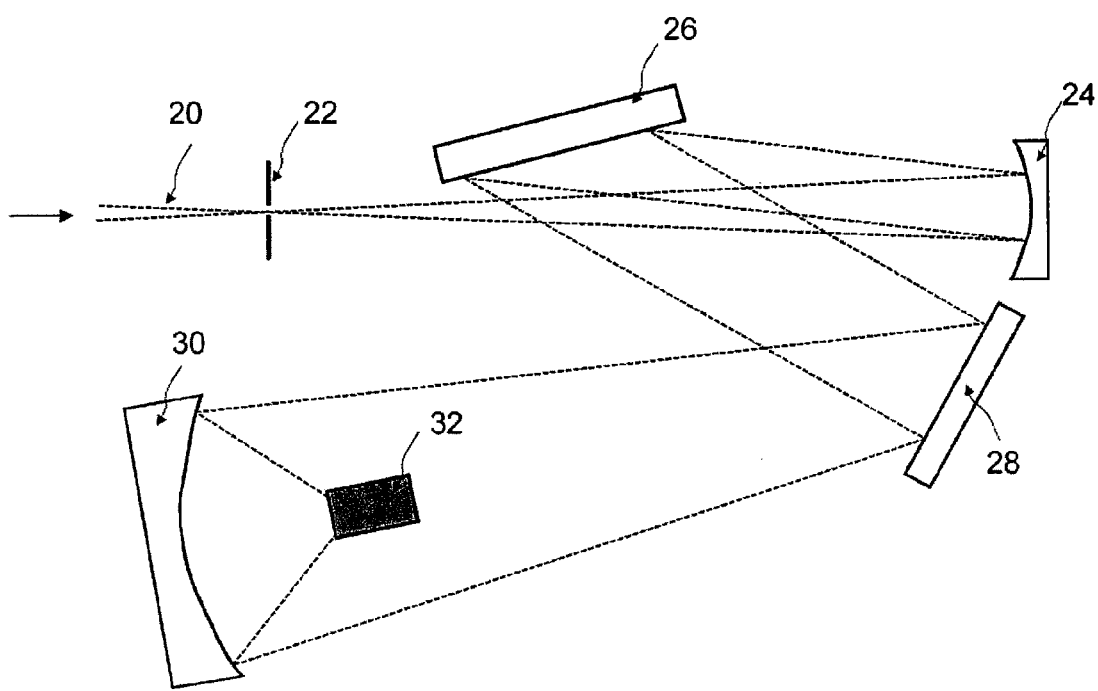
FIG. 2 is a conventional system which utilizes the principle shown in FIG. 1.

FIG. 2 depicts an exemplary conventional high resolution echelle spectrometer, known as "HIRES". This exemplary instrument includes an echelle grating in combination with a conventional diffraction grating. Such spectrometer has been designed for astronomical application to obtain the spectrum of star light in parallel with a very high resolution (<<about 0.1 nm). The light coming from the space 20 is collimated by an input slit 22 and a collimating mirror 24. The collimated light is first dispersed by an echelle grating 26 into a first spatial axis. The output beam is dispersed to multiple diffraction orders overlapped spatially. This beam is then dispersed further by a second conventional ruled grating 28. The grating direction of the second grating 28 can be oriented about 90-degree with respect to that of the first echelle grating 26. The role of the second grating can be to separate and resolve the multiple orders. The result is a 2-dimensional pattern onto which the spectrum of the input electro-magnetic radiation may be dispersed, as described in Vogt, S. S. et al. "HIRES: the high resolution echelle spectrometer on the Keck 10-m telescope." Proc. SPIE 2198, 362 (1994).

Instead of the echelle grating, other dispersive element may be used, which is capable of producing multiple dispersive orders, such as an angle-resolved Fabry Perot etalon or a virtually-imaged phased array, known as VIPA, as described in M. Shirasaki, "Large angular dispersion by a virtually imaged phased array and its application to a wavelength demultiplexer." Opt. Lett. 21, 366- (1996). In another article, i.e., Scott A. Diddams, Leo Hollbergl & Vela Mbele, "Molecular fingerprinting with the resolved modes of a femtosecond laser frequency comb." Nature 445, 627-630 (2007), a VIPA etalon was used with a conventional grating in an orthogonal arrangement. Like conventional Fabry-Perot etalons, the VIPA etalon has a free spectral range (FSR) determined by its thickness and substrate index of refraction. As a result, for an input with spectral bandwidth greater than the free spectral range, the output orders are spatially superimposed on each other. This problem is overcome by using the standard grating oriented along an orthogonal spatial axis. The grating likely provides a spectral resolution better than that of the VIPA's FSR.

In such conventional systems, the input beam is first dispersed by an echelle or VIPA etalons into a multitude of spatial orders with high spectral resolution, and the second dispersive element separate the orders so that individual high-resolution spectral components can be resolved.

In another conventional system, described in U.S. Pat. No. 6,952,260, two concave diffraction gratings are combined. The limitation to concave grating is due to the intent by the inventors to produce an image of the spectrum in the middle in order to place a slit between the two gratings.

According to one exemplary embodiment of the present invention, a "Cross-Axis Parallel Spectrometer" can be used with is based on two or more concatenated spectral dispersive elements with an orthogonal arrangement to achieve high spectral resolution as well as high dynamic range.

The exemplary embodiment of the present invention can be different from the above-described conventional systems (e.g., HIRES and VIPA plus grating) in that each dispersive element can (but is not required to) produce preferably one or only a few output orders and that the two or more dispersive elements generally have dispersive powers similar to each other.

The exemplary embodiment of the present invention can also be different from the conventional arrangement described in U.S. Pat. No. 6,952,260 since its implementation is in no way limited to concave diffraction gratings. Moreover, in one further exemplary embodiment of the present invention, the usage of image rotators (e.g., Dove Prisms) facilitates the beam propagation direction to remain in the plane of the apparatus, rather than being deviated from the plane. The latter property, e.g., referred to as three-dimensional spectrograph in U.S. Pat. No. 6,952,260, may be undesirable from a practical point of view, as it may complicate the design of the exemplary apparatus.

Figure 3:
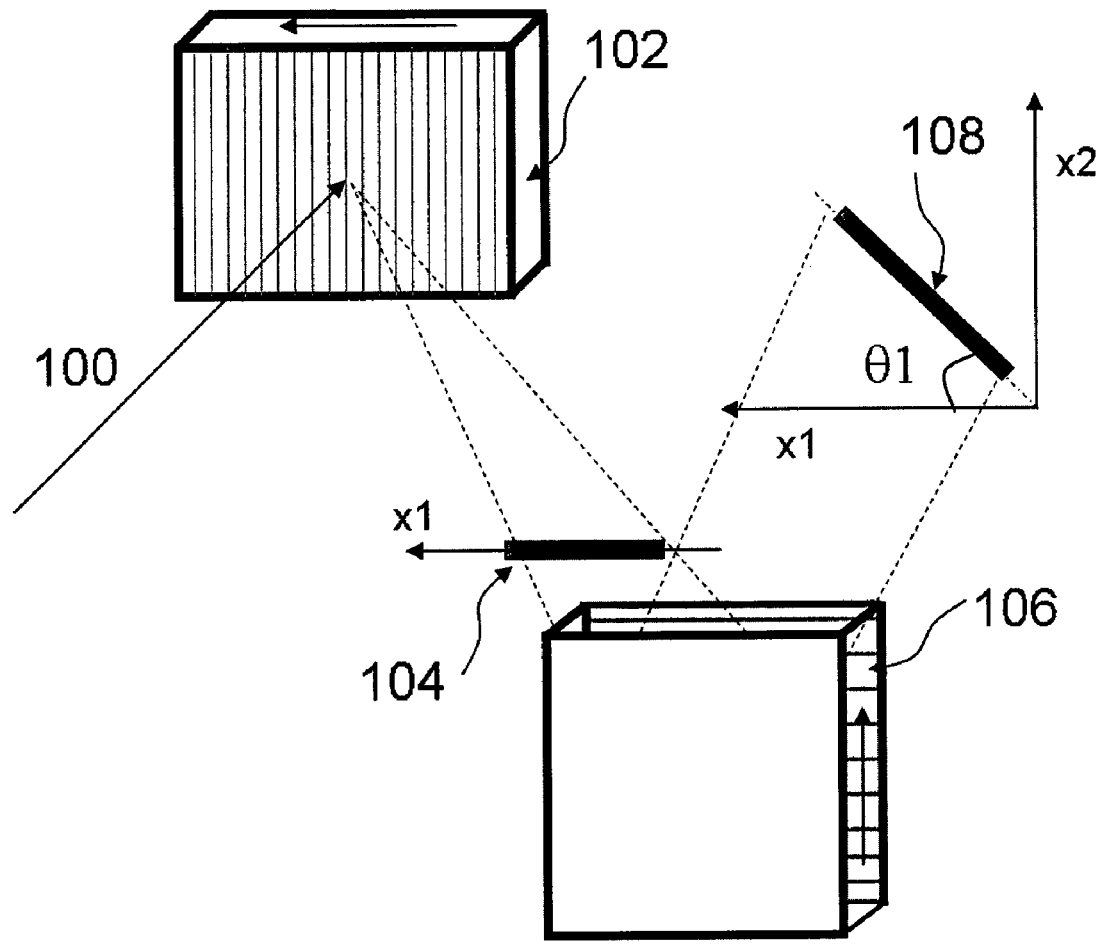
FIG. 3 is a schematic of an exemplary embodiment of this invention: a double stage grating spectrometer.

FIG. 3 shows an exemplary embodiment of an apparatus of the present invention. For example, in this exemplary embodiment, a polychromatic light 100 impinges on a first dispersive element 102, such as, e.g., a flat diffraction grating. The output beam emitted from the grating 102 can be dispersed along the horizontal axis, which may be approximately perpendicular to the grating direction and normal to the groove lines.

The dispersed beam from the first grating 104 may be directed to a second dispersive element 106, e.g., a flat ruled grating. The grating direction of the second grating 106 can be vertically oriented. Thus, its exemplary inherent dispersion axis may be vertically oriented, denoted x2. However, since the input beam to the second grating 106 can be already dispersed horizontally along the x1 axis, the output beam 108 from the second grating may then be dispersed along an axis different from either the x1 or the x2 axes.

For example, the angle θ2 between the output beam dispersive axis and the horizontal x2 axes may be provided as follows:

$$\tan\theta = \frac{p_2}{p_1} \cdot \frac{\cos\beta_2}{\cos\beta_1} \cdot \frac{l_1}{l_2} \cdot \frac{m_1}{m_2}, \quad (2)$$

where the subscripts indicate the first and second gratings. $l_{1,2}$ may denote the distance of the measurement plane from the grating. The angle θ may be about 90° ($\because l_2=0$) at the grating 2 and converge to a value corresponding to $l_1=l_2$ at infinity. For example, two identical gratings used with the same incidence angle and order would likely result in θ=45° at infinity.

With the conventional HIRES spectrometer, the spatial axis of the final output beam is likely tilted by less than 10 degrees with respect to the spatial axis of the beam after the first echelle grating.

The advantage of the design according to the exemplary embodiment of the present invention, compared to a non cross-axis double grating design, is that it provides an improved contrast. For example, due to an imperfection in the fabrication, the first grating 102 can produce non-diffracted sidebands, or stray light, along the axis x1. This white-spectrum component can remain in the x1 axis after the second grating 106, whereas the spectrum 108 or the true signal to be measured appears along the axis that is clearly separated from the x1 axis. By the same or similar principle, the stray light generated from the second grating 106 likely spreads along the x2-axis, which is also separated easily from the signal 108. As a result, the contrast, a ratio of the signal to the stray light or background, may be significantly improved. This can mean that the cross-grating spreads the error in two dimensions, while keeping the signal in one dimension. This exemplary feature may be similar to that of a conventional double-grating monochromator, where an error spread in one dimension is filtered out from a signal focused to zero dimension—a point. In contrast, the exemplary embodiment of the cross-axis arrangement allows the entire spectral signal to be acquired or processed simultaneously.

It is possible that the propagation direction of the final beam 108 may not be parallel to the plane of the exemplary apparatus, because the second grating 106, with the grating direction vertically orientated, will make the output beam deviated from the horizontal plane. In this respect, the exemplary embodiment may possibly have a similar drawback as the conventional apparatus described in U.S. Pat. No. 6,952, 260.

Figure 4:
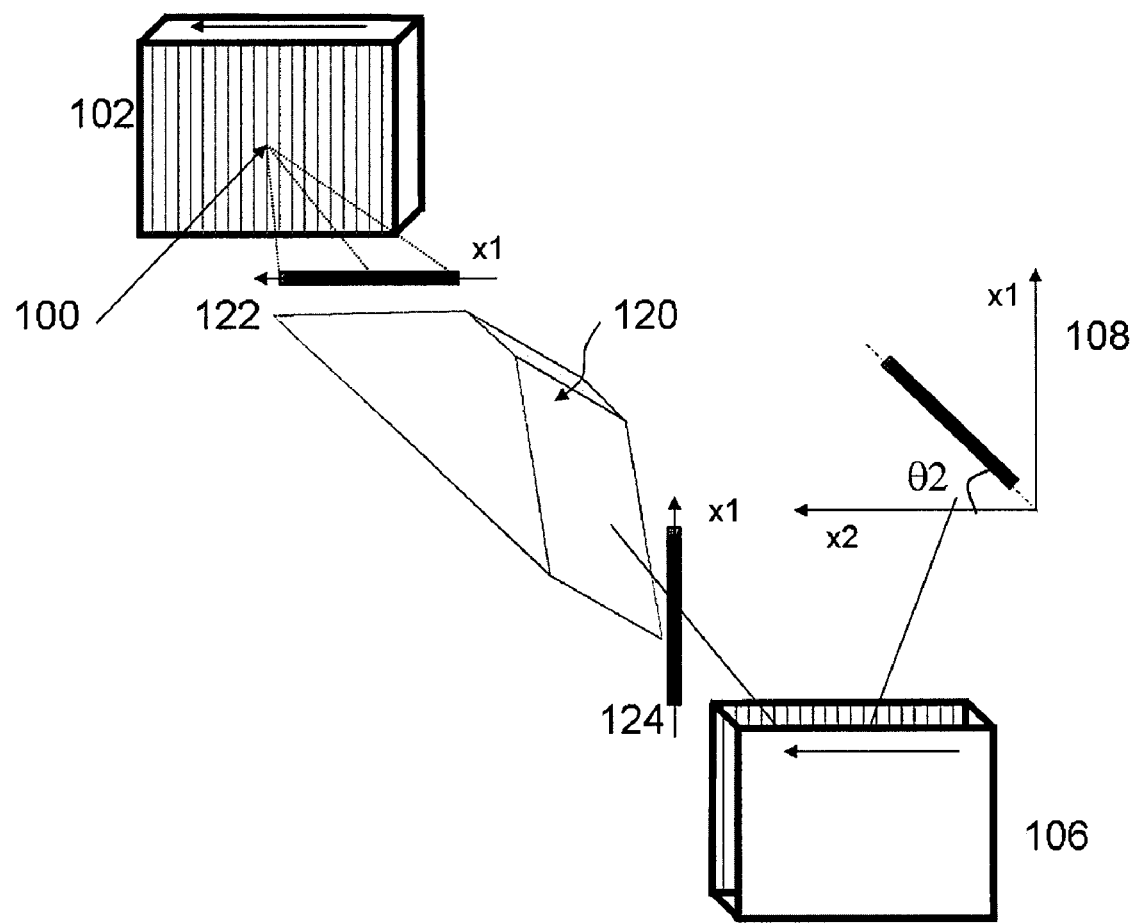
FIG. 4 is a schematic diagram of an exemplary embodiment of the present invention which includes a double stage grating spectrometer with a Dove prism.

FIG. 4 shows another exemplary embodiment of the apparatus according to the present invention which can overcome the abovementioned problem. This exemplary embodiment is essentially the same as the exemplary embodiment described above with reference to FIG. 3, except that an image rotator, such as, e.g., a dove prism 120, may be employed between the first grating 102 and the second grating 106. The grating axis of the second grating 106 can be the same as that of the first grating 102. This is made possible by the dove prism 120. For example, the prism 120 can tilt at about 45 degrees in the plane orthogonal to the propagation direction of the beam. As a result, the prism 120 rotates the orientation of the dispersed beam 122 by about 90 degrees. The input beam 124 to the second grating 106 can then be vertically dispersed. The output beam 108 of the second grating may then be dispersed into the axial line that is different from the x1 and x2 axes. The propagation direction of the output beam 108 essentially lies parallel to the apparatus, providing a possibly simpler apparatus.

The exemplary embodiment of the apparatus may further comprise a detector array, such as, e.g., a CCD digital camera, to detect the spectrum 108. The exemplary apparatus can further employ a detector array that may detect the spectrum 108. A two-dimensional CCD camera may be used for the detection. Another dove prism may be placed between the detector array and the second grating 106 to rotate the beam 108 to be approximately parallel to either the horizontal or vertical axis. This exemplary apparatus can simply the construction of the apparatus, and facilitate a line scan camera to be used.

In addition to a Dove prism, other image rotating devices, such as, e.g., an Abbe prism and a Pechan prism, or a combination of three rotating mirrors may be used.

The exemplary apparatus may further comprise spatial masks or filtering arrangement between the gratings or before the CCD camera to block stray light or attenuate specific frequency components. The spatial masks can include one of a slit, square aperture, patterned neutral density filter, or spatial-light modulator.

The exemplary apparatus may further comprise more spectral dispersive elements following the second grating, concatenated in the same way that the diffraction (grating) axis of the element is orthogonal to the spatial axis of its input beam. The use of Dove prism may be particularly useful in cascading more than two gratings under the cross-axis principle. For example, a third grating with the same orientation as the first two gratings may be concatenated with a second Dove prism that rotates the output beam axis to be vertical and a vertical slit to block the stray light.

According to still another exemplary embodiment, two standard ruled diffraction gratings with 1,200 lines per mm (Edmund Optics) may be provided. The light sources of a single-frequency laser at 532 nm and a white light-emitting diode (LED) can be used. A dove prism can also be used between the first and second stages. FIGS. 5(a)-5(d) illustrate an exemplary output beam projected on a white glossy paper screen with a 60-mm focal length lens and photographed by a digital camera (DS200, Nikon) using such exemplary embodiment.

Figure 5:
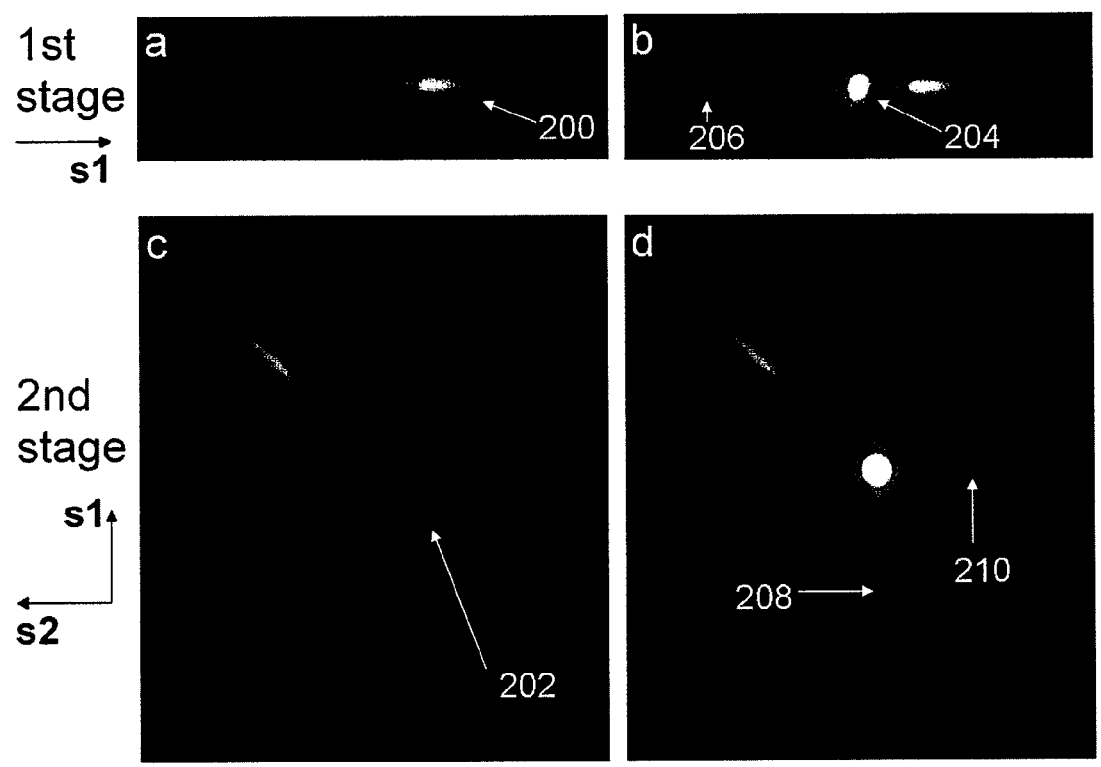
FIG. 5 is an illustration of exemplary results obtained with a prototype cross-axis grating spectrometer according to an exemplary embodiment of the present invention.

For example, FIGS. 5(a) and 5(c) show the dispersed beams measured after the first and second gratings, respectively, with white light from the LED source. The beam 200 after the first grating is horizontally dispersed, whereas the output beam 202 after the second grating is spread at approximately 45 degree. FIGS. 5(b) and 5(d) show the dispersed beams measured after the first and the second gratings, obtained with the high intensity output from the green laser as well as the LED white light. The output of the first grating (shown in FIG. 5(b)) indicates the diffraction pattern consisting of the intense green light 204 and the rainbow spectrum of the LED light. Besides, the sideband or the stray light 206 produced by the grating due to the input intense green beam is also clearly seen. This sideband problem, probably due to the imperfection in the grating fabrication, make it difficult to detect weak spectral components (LED light in this case) in the presence of a strong dominating spectral component (green laser light in this case), e.g., limiting the dynamic range of the spectral measurement.

One of the advantage provided by the exemplary embodiments of the present invention, e.g., using a multiple stage spectrometer, is demonstrated in FIG. 5(d). For example, after the second grating, the stray light from the first grating may remain along the vertical axis 208, whereas the stray light generated from the second grating is present in the horizontal axis 210. In contrast, the spectrum of the input beam 202 (e.g., green laser+LED light) can be dispersed along the axis tilt by 45 degrees. Therefore, the spectrum can be measured with greater dynamic range with less background or stray light.

To further reduce the stray light, the exemplary apparatus may further utilize a spatial filtering arrangement between the gratings.

To measure the spectrum quantitative, the exemplary apparatus can further comprise a detector array, such as, e.g., a CCD or CMOS camera, to detect the dispersed output beam. Digital cameras generally have a finite dynamic range limited primarily by their bit resolution. In principle, certain 16-bit camera can offer a dynamic range no more than 48.2 dB. In order to take advantage of the high dynamic range offered by the cross-axis multiple stage gratings, methods to overcome the limited detector dynamic range should be employed.

Figure 6:
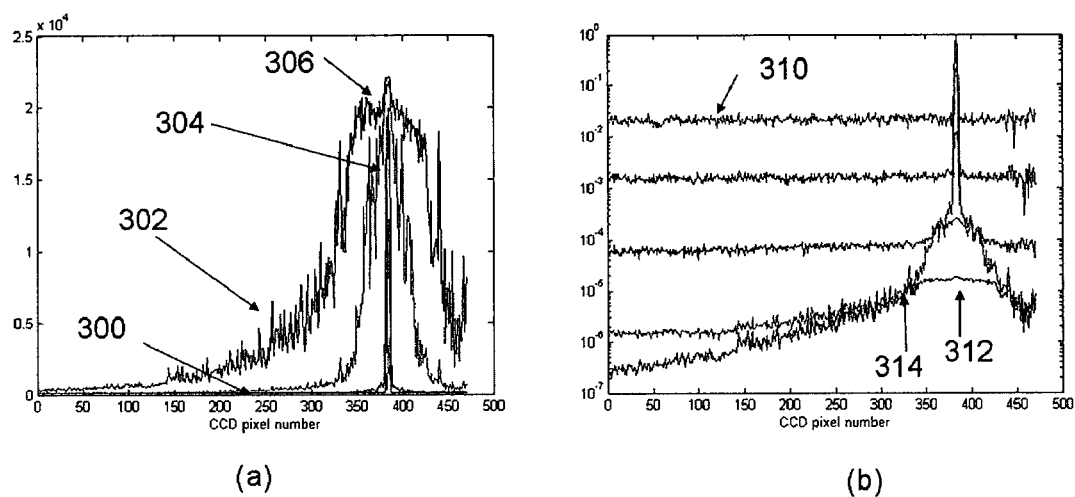
FIG. 6 is a graph of exemplary data obtained using an exemplary embodiment of a method according to the present invention for improving the measurement dynamic range.

One exemplary embodiment of a method according to the present invention to address this issue is provided as follows. An exemplary step according to such exemplary embodiment can be to provide the spectral measurement at multiple signal levels, either by changing the gain of the camera or attenuating the beam entering the camera with a variable attenuator. FIGS. 6(a) and 6(b) show exemplary results of an experimental demonstration of the exemplary embodiment of the method according to the present invention. For example, the camera output 300 obtained at a low gain or high attenuation level facilitates a measurement of strong frequency components 304 without having a detector saturation problem. In contrast, the measurement taken at a higher gain or smaller attenuation generally reveal weak spectral components 302, although the strong frequency components 306 likely saturate the CCD signal.

An accurate calibration of the power level and a suitable data processing procedure facilitates a reconstruction the full dynamic range of the spectrometer, e.g., by filtering out electrical noise and other portions of the acquired spectra which do not provide useful information and by retaining only the significant parts of the spectrum. In order to exemplify this procedure, we used monochromatic light from a green laser as input for the spectrometer and a CCD camera (Roper Scientific) with a camera (detector) dynamic range of about 20 dB. It is possible to take a certain number of measurements with corresponding number of different calibrated power settings of the laser (by controlling a built-in attenuator). The first power level may be intentionally set to be at the limit of the saturation of the detecting device; the others can be increased by various orders of magnitude (e.g., 11 dB, 26 dB, 43 dB, 55 dB) to exploit the full dynamic range of the spectrometer.

For example, FIG. 6(b) shows a graph of the exemplary raw data acquired with such exemplary five measurements, plotted after calibrating the output with their individual attenuation values. The scale in the y-axis spans almost 80 dB. Another step of the exemplary embodiment of the data processing procedure according to the present invention can be to identify and remove the following: (i) the electrical noise level 310, e.g., the flat regions of the low power curves, and (b) the saturated regions 312, e.g., the flat or amorphous regions of the high power curves. Furthermore, the exemplary procedure can involve identifying crossing points, e.g., 314 points, and connecting two curves smoothly.

In this exemplary situation where there is only one main spectral peak, it is possible to establish a threshold that decides which data of each curve can be significant and should be retained. Such threshold is mathematically linked to the plateau of electrical noise of each curve (e.g., the flat region 310). Other features to refine the exemplary processing procedure are represented by the first and second derivative of each curve because such derivatives provide a signature to identify the flat noise 310 or the saturation 312, and may accurately identify the presence of the main spectral peak. Other exemplary procedures are known in the art to reconstruct the full spectrum from the data set.

Figure 7:
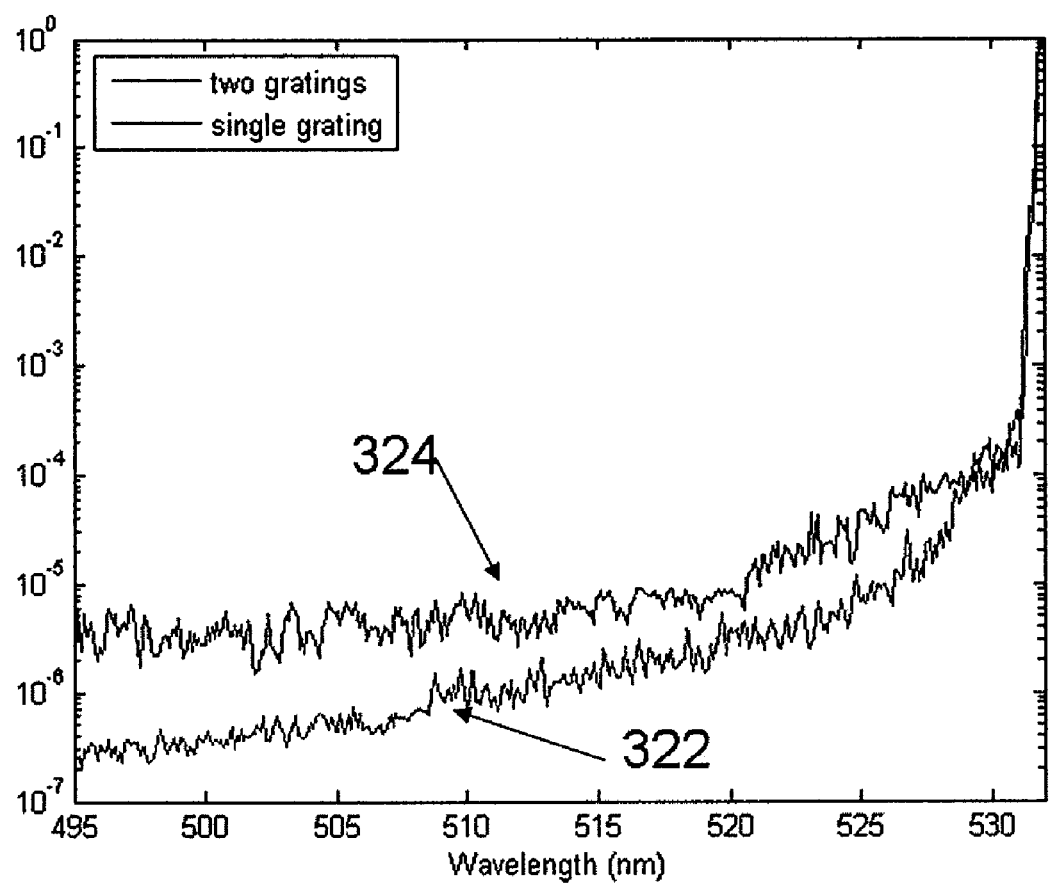
FIG. 7 is a graph of an exemplary reconstructed spectral output obtained with an exemplary embodiment of the method according to the present invention.

FIG. 7 shows a graph of an exemplary result of the exemplary simple processing procedure according to the present invention which illustrates a reconstructed spectra measured after the first and second gratings, respectively. For example, the total measurement dynamic range can be almost 70 dB. Over a 30 nm span, the two-stage measurement 322 may offer the higher measurement dynamic range than the single-stage measurement 324 by about 5-12 dB.

In terms of throughput efficiency, the exemplary penalty to pay for the addition of each stage is given by the efficiency of the grating (in certain exemplary embodiment, the grating may be used in a configuration with maximum of about 30% efficiency) and by the transmission efficiency of the dove prism. Exemplary holographic gratings with greater than about 90% efficiency are commercially available. In terms of resolution, the exemplary spectrometer described herein can featured about 0.1 nm.

For example, a tilt Dove prism can cause a small polarization change because the s- and p-components undergo different phase shifts upon total internal reflection. The polarization dependence of the gratings may cause a measurement error, which can be avoided by polarization diversity based on polarization beam splitters and birefringence plates. Various polarization diversity schemes are well known in the art (see, e.g., Scott A. Diddamsl, Leo Hollbergl & Vela Mbele, "Molecular fingerprinting with the resolved modes of a femtosecond laser frequency comb." Nature 445, 627-630 (2007)), and can be applied and utilized with the exemplary embodiments of the present invention.

Figure 8:
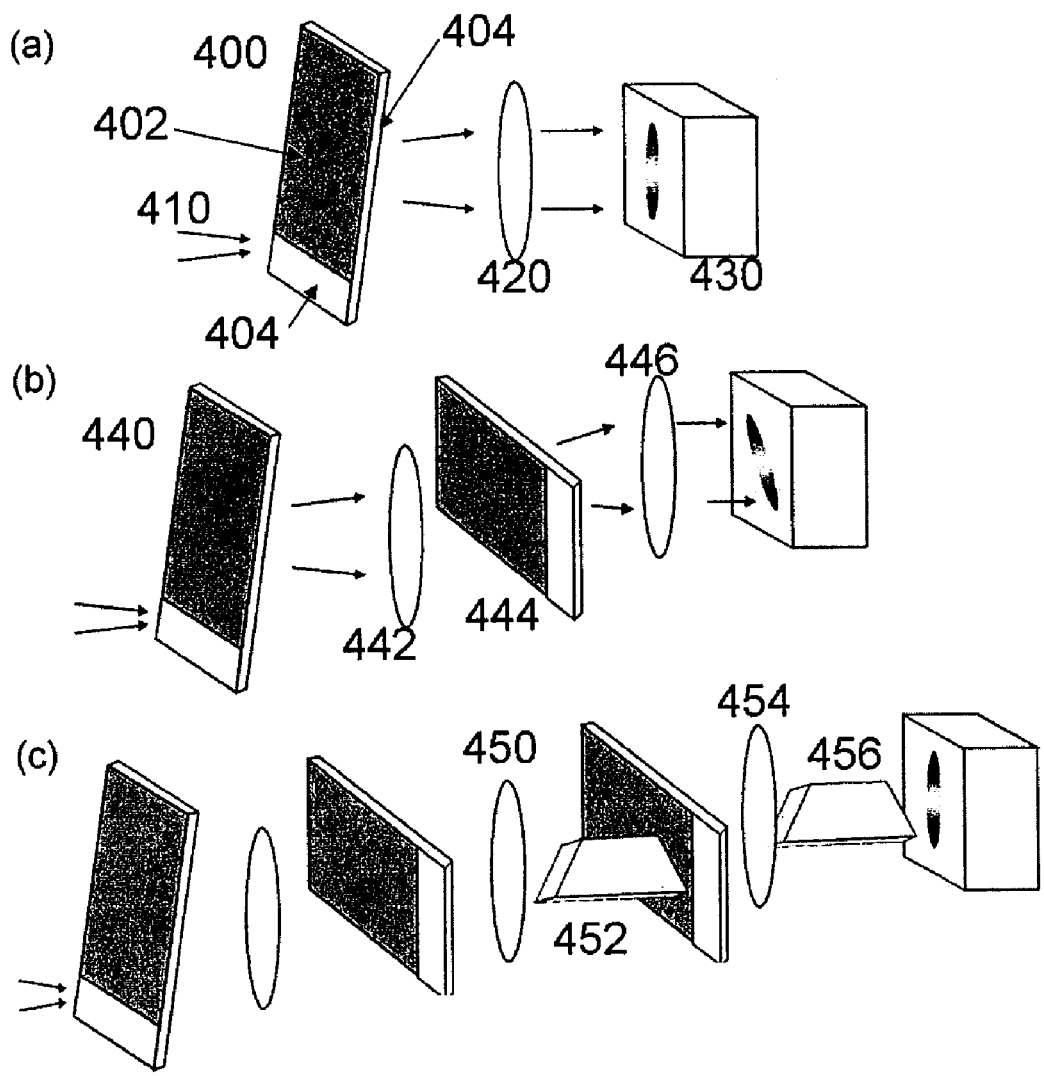
FIGS. 8(a)-8(c) are exemplary schematic setups of VIPA based spectrometers in according to exemplary embodiments of the present invention.

Although the exemplary embodiments of the present invention can utilize the diffraction gratings as exemplary dispersive elements, other exemplary embodiments can use other elements, such as prisms or VIPA etalons. (See, e.g., M. Shirasaki, "Large angular dispersion by a virtually imaged phased array and its application to a wavelength demultiplexer." Opt. Lett. 21, 366- (1996)). FIGS. 8(a)-8(c) show exemplary embodiments of arrangements of various VIPA based spectrometers according to the present invention. For example, VIPA 400 can be essentially a solid etalon with three different surface coatings. The front surface 402 may be highly reflective, e.g., except for a narrow beam entrance window 404 with an anti-reflection coating. The back surface 404 may be partially reflective. An input beam 410, line-focused by a cylindrical lens, can enter the etalon at an angle through the transparent window, makes multiple internal reflections, and produces an array of output beams with increasing phase delays. Similarly to a diffraction grating, the interference among the phased array beams provides angular dispersion so that different frequency components are emitted at different angles. It is possible to obtain high throughput because nearly all the photons arriving at the VIPA are eventually transmitted forward and can be detected. The dispersed beam may be focused by a lens arrangement 420 to a CCD camera 430.

According to still another exemplary embodiment of the present invention, it is possible to provide custom-made VIPA etalons made of a silica substrate (e.g., 25 mm by 25 mm by 3 mm) with dielectric coatings. The reflectivity of the front and back surfaces may be about 99.9% and 95%, respectively. The beam entrance window can be about 5 mm wide and the beam entrance angle may be about 1.6°. The free spectral range can be about 33.3 GHz, and a finesse of up to 56 can be obtained.

For example, FIG. 8(b) shows a diagram of an exemplary embodiment of the cross-axis two-stage VIPA spectrometer according to the present invention. The first VIPA etalon 440 can provide dispersion along the vertical direction. The output from the first stage may be delivered through a lens arrangement 442, for example, a combination of a cylindrical lens and a spherical lens, to a second VIPA etalon 444, oriented along the horizontal direction. Another lens arrangement 446, for example a spherical lens, can direct the output from the second VIPA to the CCD camera.

FIG. 8(c) shows an exemplary embodiment of a three-stage cross-axis parallel spectrometer according to the present invention. After a lens arrangement 450, a dove prism 450 may be employed to rotate the spatial axis of the beam. After the final lens arrangement 454, another dove prism 456 may be inserted to rotate the output beam.

The exemplary embodiment of the present invention can further comprise spatial filters placed between the VIPA etalons to tailor the spectrum (e.g. to block the Rayleigh light in Brillouin spectroscopy). Additional optical elements, such as cylindrical and aspherical lenses, may be needed to relay the spectral image more efficiently.

Figure 9:
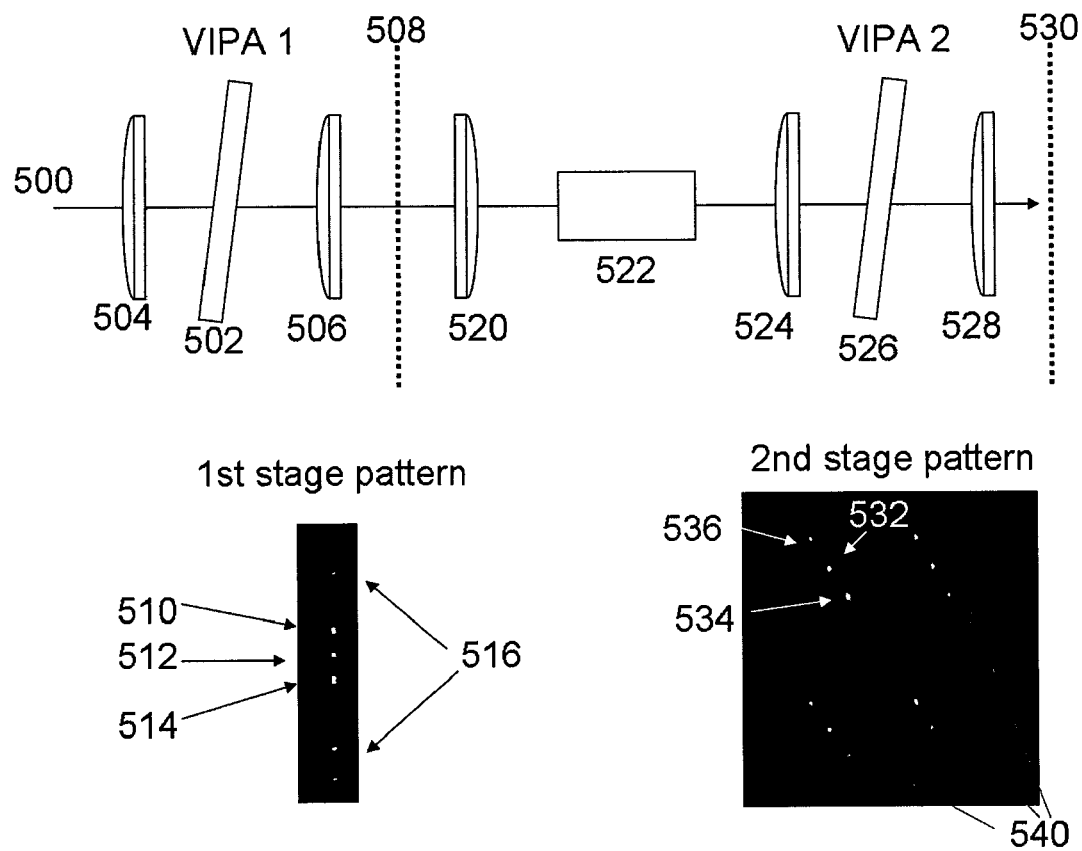
FIG. 9 is a detailed illustration of an exemplary embodiment of a two-stage cross-axis VIPA spectrometer according to the present invention.

FIG. 9 shows a more detailed schematic of the two-stage VIPA spectrometer. In the first stage, the incoming beam of light 500 is focused on the first etalon 502 by a cylindrical lens 504 after the multiple reflections in the VIPA element, a second cylindrical lens 506 produces the first spectrally separated pattern (shown below the dashed line 508). As shown in the patterns of FIG. 9, three peaks 510, 512, and 514 are indicated as being separated by only about 7.5 GHz and with an extinction of about 35 dB. For example; the exemplary design parameters of the spectrometer can be can be modified to reduce side diffraction orders (e.g., two side orders 516 are barely visible in FIG. 9).

After the first exemplary stage, a cylindrical lens 520 and a spherical lens 524 relays the beam to the second VIPA stage. In between, a beam controlling arrangement 522 can be employed, which includes at least one of a Dove prism or spatial filter. The output of the second VIPA may be focused by a spherical lens 528. A CCD camera 530 can be used to record the spectrum. The recorded pattern may show the Rayleigh line 532 and Brillouin lines, 534 and 536, as well as three additional diffraction orders 540. In this exemplary embodiment, at about 7.5 GHz, the extinction can be increased to 55 dB.

Figure 10:
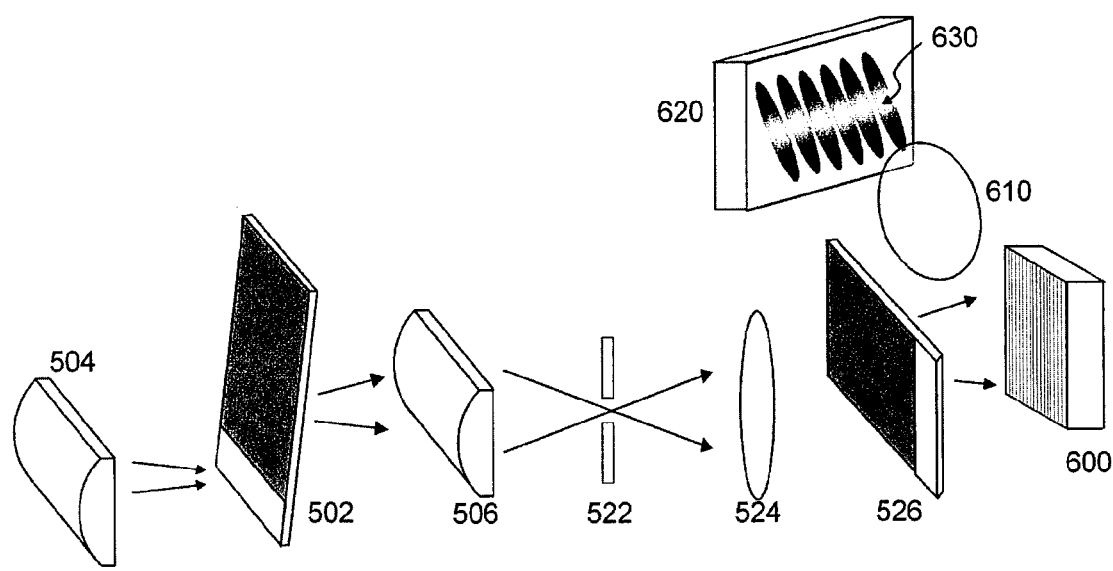
FIG. 10 is a schematic diagram of a further exemplary embodiment of a VIPA-grating spectrometer according to the present invention.

The two-stage VIPA spectrometer can further comprise a diffraction grating 600 to separate different orders generated from the VIPA stages, as shown in the exemplary arrangement of FIG. 10. In this exemplary embodiment, the diffracted pattern may be focused by a lens 610 to a camera 620. The final spectrum 630 recorded in two dimensions may be analyzed to determine the spectrum with high resolution over a wide range.

Figure 11:
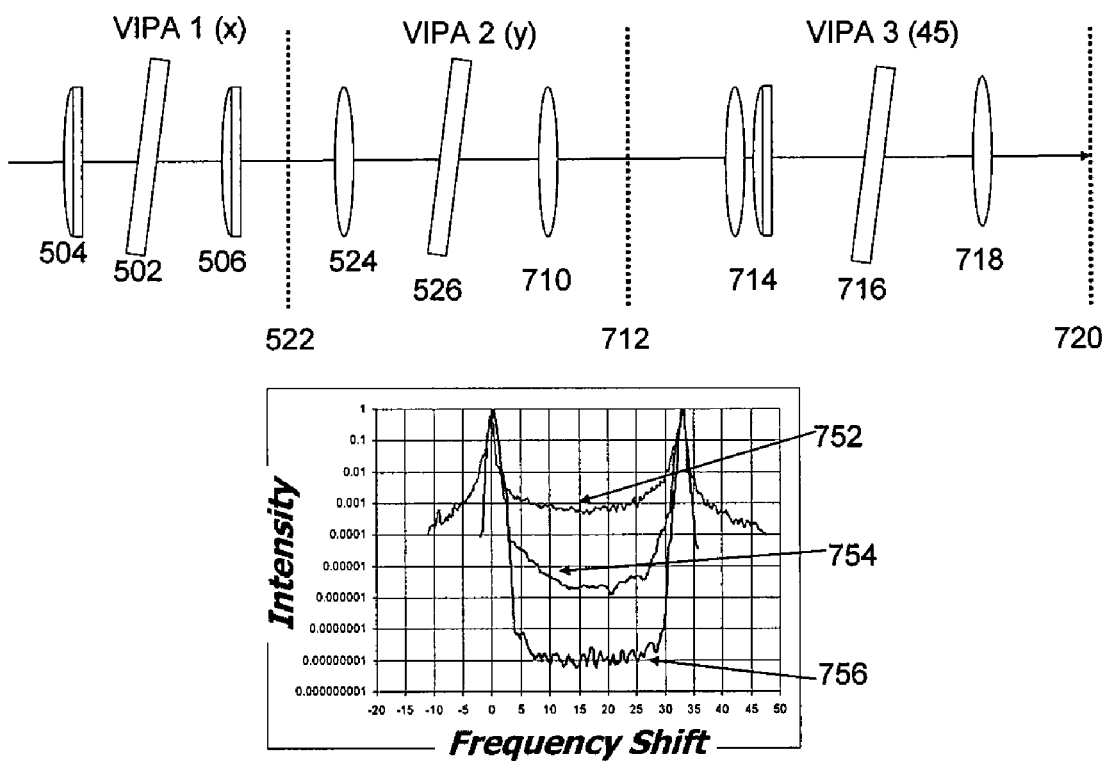
FIG. 11 is a detailed illustration of an exemplary embodiment of a three-stage cross-axis VIPA spectrometer according to the present invention and a comparison of the extinction performances of single VIPA spectrometer versus double and triple cross-axis VIPA spectrometers.

FIG. 11 shows a further detailed schematic of the three-stage cross-axis VIPA spectrometer according to a particular exemplary embodiment of the present invention. For example, in the first stage of this exemplary embodiment, the incoming beam of light may be focused on the first etalon 502 by a cylindrical lens 504 after the multiple reflections in the VIPA element. A second cylindrical lens 506 can produce the first spectrally separated pattern. After the first exemplary stage, a cylindrical lens 520 and a spherical lens 524 can relay the beam to the second VIPA element 526. Between the first and second stages, a beam controlling arrangement 522 can be employed, which can include at least one of a Dove prism or spatial filter. If no rotation arrangement is used, the VIPA etalon 526 may be oriented normally to the first VIPA element 502. As the VIPA etalons generally do not change significantly in the direction of propagation of the light, hence they can be conveniently cascaded even without image rotators. The output of the second VIPA may be relayed to a third VIPA stage by a spherical lens 528 and a set of spherical plus cylindrical lens 714. Between the second and third stages, a beam controlling arrangement 712 can be employed, which may include at least one of a Dove prism or spatial filter. If no rotation arrangement is used, the third VIPA etalon 716 can be oriented at an angle that depends on the relative dispersive power of first and second stage; in case of similar or identical VIPA 1 and VIPA 2 operated in the same conditions, VIPA 3 can be provided at 45 degrees. The orientation of the relay cylindrical lens in 714 may follow the same criteria of the orientation of the third etalon 716. The final pattern can be focused by a spherical lens 718. In the plane 720 where the final pattern is produced, a CCD camera can be used to record the spectrum.

FIG. 11 also shows certain exemplary experimental data on the extinction provided by single- double- and triple-VIPA spectrometers, according to certain exemplary embodiments of the present invention. The intensity of monochromatic green light can be shown versus the shift in frequency. Two orders of diffraction may be shown, separated by the free spectral range (FSR) of the spectrometer (33 GHz). An exemplary curve 752 can refer to a single VIPA etalon, and may experimentally illustrate an extinction of about 34 dB at half FSR. An exemplary curve 754 may refer to a double-stage VIPA spectrometer, whose extinction can be measured to be about 59 dB. An exemplary curve 756 may refer to a triple VIPA spectrometer whose extinction may be about 80 dB.

The foregoing merely illustrates the principles of the invention. Various modifications and alterations to the described embodiments will be apparent to those skilled in the art in view of the teachings herein. Indeed, the arrangements, systems and methods according to the exemplary embodiments of the present invention can be used with imaging systems, and for example with those described in International Patent Application PCT/US2004/029148, filed Sep.

8, 2004, U.S. patent application Ser. No. 11/266,779, filed Nov. 2, 2005, and U.S. patent application Ser. No. 10/501,276, filed Jul. 9, 2004, the disclosures of which are incorporated by reference herein in their entireties. It will thus be appreciated that those skilled in the art will be able to devise numerous systems, arrangements and methods which, although not explicitly shown or described herein, embody the principles of the invention and are thus within the spirit and scope of the present invention. In addition, to the extent that the prior art knowledge has not been explicitly incorporated by reference herein above, it is explicitly being incorporated herein in its entirety. All publications referenced herein above are incorporated herein by reference in their entireties.

Exemplary References cited Herein are as follows:
[1] Vogt, S. S. et al. "HIRES: the high resolution echelle spectrometer on the Keck 10-m telescope." Proc. SPIE 2198, 362 (1994).
[3] M. Shirasaki, "Large angular dispersion by a virtually imaged phased array and its application to a wavelength demultiplexer." Opt. Lett. 21, 366- (1996).
[3] Scott A. Diddamsl, Leo Hollbergl & Vela Mbele, "Molecular fingerprinting with the resolved modes of a femtosecond laser frequency comb." Nature 445, 627-630 (2007)
[4] D. Derickson, Fiber Optic Test and Measurement, Upper Saddle River, N.J.: Prentice Hall, 1998.

What is claimed is:

1. An apparatus comprising:
   at least one first spectral separating arrangement which is structured to receive at least one first electro-magnetic radiation and generate at least one second electro-magnetic radiation, wherein a first spectrum of the at least one second electro-magnetic radiation is dispersed along at least one first dispersive axis with respect to a propagation direction of the at least one second electro-magnetic radiation;
   at least one second arrangement which is configured to receive the at least one second electro-magnetic radiation and produce at least one third electromagnetic radiation having a second spectrum dispersed along at least one second dispersive axis with respect to a propagation direction of the at least one third electromagnetic radiation, wherein orientations of the respective first and second dispersive axes are different from one another; and
   at least one third spectral separating arrangement which is structured to receive at least one third electro-magnetic radiation and generate at least one fourth electro-magnetic radiation, wherein a third spectrum of the at least one fourth electro-magnetic radiation is dispersed along at least one third dispersive axis with respect to a propagation direction of the at least one fourth electro-magnetic radiation, wherein orientations of the respective second and third dispersive axes are different from one another, and wherein the orientations of the respective first and third dispersive axes are different from one another.

2. The apparatus according to claim 1, wherein an angle between the first and second dispersive axes is approximately 90 degrees.

3. An apparatus comprising:
   at least one first spectral separating arrangement which is structured to receive at least one first electro-magnetic radiation and generate at least one second electro-magnetic radiation, wherein a first spectrum of the at least one second electro-magnetic radiation is dispersed along at least one first dispersive axis with respect to a propagation direction of the at least one second electro-magnetic radiation; and
   at least one second arrangement which is configured to receive the at least one second electro-magnetic radiation and produce at least one third electromagnetic radiation having a second spectrum dispersed along at least one second dispersive axis with respect to a propagation direction of the at least one third electromagnetic radiation, wherein orientations of the respective first and second dispersive axes are different from one another, and wherein the at least one second arrangement is an optical arrangement which rotates an orientation of the spectrum of the at least one second electromagnetic radiation.

4. The apparatus according to claim 3, wherein the optical arrangement includes at least one of a Dove-type prism, an Abbe prism, a Pechan prism or a plurality of rotating mirrors.

5. The apparatus according to claim 1, wherein the at least one first spectral separating arrangement includes at least one a grating, a prism or a VIPA etalon.

6. The apparatus according to claim 1, wherein the at least one third spectral separating arrangement includes at least one a grating, a prism or a VIPA etalon.

7. The apparatus according to claim 1, further comprising at least one detector-array arrangement configured to detect at least one portion of the second spectrum.

8. The apparatus according to claim 1, further comprising at least one detector-array arrangement configured to detect at least one portion of the third spectrum.

9. The apparatus according to claim 8, wherein the at least one detector-array arrangement include a linear CCD array.

10. An apparatus comprising:
    at least one first spectral separating arrangement which is structured to receive at least one first electro-magnetic radiation and generate at least one second electro-magnetic radiation, wherein a first spectrum of the at least one second electro-magnetic radiation is dispersed along at least one first dispersive axis with respect to a propagation direction of the at least one second electro-magnetic radiation; and
    at least one second arrangement which is configured to receive the at least one second electro-magnetic radiation and produce at least one third electromagnetic radiation having a second spectrum dispersed along at least one second dispersive axis with respect to a propagation direction of the at least one third electromagnetic radiation, wherein orientations of the respective first and second dispersive axes are different from one another, and
    a spatial filtering arrangement which is configured to modify at least one property of at least one portion of at least one of the at least one second electro-magnetic radiation or the at least one third electro-magnetic radiation.

11. The apparatus according to claim 1, further comprising a spatial filtering arrangement which is configured to modify at least one property of at least one portion of at least one of the second, third or fourth electro-magnetic radiation.

12. The apparatus according to claim 11, further comprising at least one detector-array arrangement configured to receive further radiation effected by the modified portion.

13. The apparatus according to claim 10, wherein the spatial filtering arrangement includes at least one slit.

14. An apparatus comprising:
    a first VIPA etalon arrangement which is structured to receive at least one first electro-magnetic radiation and generate at least one second electro-magnetic radiation, wherein a first spectrum of the at least one second electro-magnetic radiation is dispersed along at least one first dispersive axis with respect to a propagation direction of the at least one second electro-magnetic radiation; and a second VIPA etalon arrangement which is structured to receive at least one third electro-magnetic radiation associated with the at least one second electro-magnetic radiation and generate at least one fourth electro-magnetic radiation, wherein a second spectrum of the at least one fourth electro-magnetic radiation is dispersed along at least one second dispersive axis with respect to a propagation direction of the at least one fourth electro-magnetic radiation, and wherein the orientations of the first and second dispersive axes are different from one another.

15. The apparatus according to claim 14, further comprising at least one third optical arrangement which receives the at least one second electro-magnetic radiation and generates the at least one third electro-magnetic radiation.

16. The apparatus according to claim 14, wherein the at least one third optical arrangement includes at least one of a lens arrangement, at least one slit or a Dove prism.

17. The apparatus according to claim 14, further comprising at least one detector-array arrangement configured to detect at least one portion of the second spectrum.

18. The apparatus according to claim 14, further comprising at least one dispersive arrangement which is configured to receive at least one fifth electromagnetic radiation associated with the at least one fourth electromagnetic radiation, and generate a third spectrum.

19. A method comprising:
receiving at least one first electro-magnetic radiation and generate at least one second electro-magnetic radiation using a first VIPA etalon arrangement, wherein a first spectrum of the at least one second electro-magnetic radiation is dispersed along at least one first dispersive axis with respect to a propagation direction of the at least one second electro-magnetic radiation;

receiving at least one third electro-magnetic radiation associated with the at least one second electro-magnetic radiation using a second VIPA etalon arrangement; and generating at least one fourth electro-magnetic radiation using the second VIPA etalon arrangement, wherein a second spectrum of the at least one fourth electro-magnetic radiation is dispersed along at least one second dispersive axis with respect to a propagation direction of the at least one fourth electro-magnetic radiation, and wherein the orientations of the first and second dispersive axes are different from one another.

20. An apparatus comprising:
a first dispersive arrangement which is structured to receive at least one first electro-magnetic radiation and generate at least one second electro-magnetic radiation, wherein a first spectrum of the at least one second electro-magnetic radiation is dispersed along at least one first dispersive axis with respect to a propagation direction of the at least one second electro-magnetic radiation, wherein the first dispersive arrangement includes a flat planar grating; and a second dispersive arrangement which is structured to receive at least one third electro-magnetic radiation associated with the at least one second electro-magnetic radiation and generate at least one fourth electro-magnetic radiation, wherein a second spectrum of the at least one fourth electro-magnetic radiation is dispersed along at least one second dispersive axis with respect to a propagation direction of the at least one fourth electro-magnetic radiation, and wherein the angle between the first and second dispersive axes is greater than about 15 degrees.

21. The apparatus according to claim 20, wherein the second dispersive arrangement includes a flat planar grating.

22. A method comprising:
with at least one first spectral separating arrangement, receiving at least one first electro-magnetic radiation, and generating at least one second electro-magnetic radiation, wherein a first spectrum of the at least one second electro-magnetic radiation is dispersed along at least one first dispersive axis with respect to a propagation direction of the at least one second electro-magnetic radiation; and with at least one second optical arrangement, receiving the at least one second electro-magnetic radiation, and producing at least one third electromagnetic radiation having a second spectrum dispersed along at least one second dispersive axis with respect to a propagation direction of the at least one third electromagnetic radiation, wherein orientations of the respective first and second dispersive axes are different from one another; and rotating an orientation of the spectrum of the at least one second electromagnetic radiation.

* * * * *